(12) United States Patent
Nakatani

(10) Patent No.: US 7,027,711 B2
(45) Date of Patent: Apr. 11, 2006

(54) EDITING APPARATUS FOR AN OPTICAL DISK, COMPUTER-READABLE STORAGE MEDIUM, AND COMPUTER PROGRAM

(75) Inventor: Tokuo Nakatani, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1043 days.

(21) Appl. No.: 09/891,128

(22) Filed: Jun. 26, 2001

(65) Prior Publication Data

US 2002/0012523 A1 Jan. 31, 2002

(30) Foreign Application Priority Data

Jun. 26, 2000 (JP) .............................. 2000-190892

(51) Int. Cl.
*H04N 5/592* (2006.01)
*H04N 5/781* (2006.01)

(52) U.S. Cl. ........................................ 386/52; 386/125

(58) Field of Classification Search ................. 369/32, 369/275; 348/584

See application file for complete search history.

(56) References Cited

U.S. PATENT DOCUMENTS

| | | | | |
|---|---|---|---|---|
| 6,078,727 A | * | 6/2000 | Saeki et al. ................. | 386/125 |
| 6,148,140 A | * | 11/2000 | Okada et al. ................ | 386/105 |
| 6,212,330 B1 | * | 4/2001 | Yamamoto et al. ........... | 386/95 |
| 6,308,005 B1 | * | 10/2001 | Ando et al. .................... | 386/95 |
| 6,330,392 B1 | * | 12/2001 | Nakatani et al. .............. | 386/52 |
| 6,603,923 B1 | * | 8/2003 | Ando et al. .................. | 386/125 |

FOREIGN PATENT DOCUMENTS

| | | |
|---|---|---|
| EP | 860 829 | 8/1998 |
| EP | 0 903 743 | 3/1999 |
| EP | 965 991 | 12/1999 |
| EP | 1 085 513 | 3/2001 |
| JP | 9-259542 | 10/1997 |
| JP | 10-234002 | 9/1998 |
| JP | 11-96730 | 4/1999 |
| JP | 11-155130 | 6/1999 |
| JP | 2000-4421 | 1/2000 |
| JP | 2000-69414 | 3/2000 |
| JP | 2000-78519 | 3/2000 |

\* cited by examiner

*Primary Examiner*—James J. Groody
*Assistant Examiner*—Mishawn Dunn
(74) *Attorney, Agent, or Firm*—Wenderoth, Lind & Ponack, L.L.P.

(57) ABSTRACT

A VOB composed of a plurality of VOBUs and Cell information are recorded on an optical disk. Each VOBU includes a plurality of sets of picture data, and the Cell information specifies a reproduction section (Cell). According to a user indication, picture data corresponding to an IN point of a delete section and picture data corresponding to an OUT point of the delete section are specified in the Cell. If the number (j−i−1) of VOBUs present between the ith VOBU including the former picture data and the jth VOBU including the latter picture data is smaller than a predetermined number u, a warning of a data size increase is displayed. If j−i−1 is greater than u, the Cell information is rewritten so that the parts of the Cell preceding and succeeding the delete section become two consecutive Cells, and the (i+s+1)th to (j−t−1)th VOBUs are deleted from the optical disk.

22 Claims, 26 Drawing Sheets

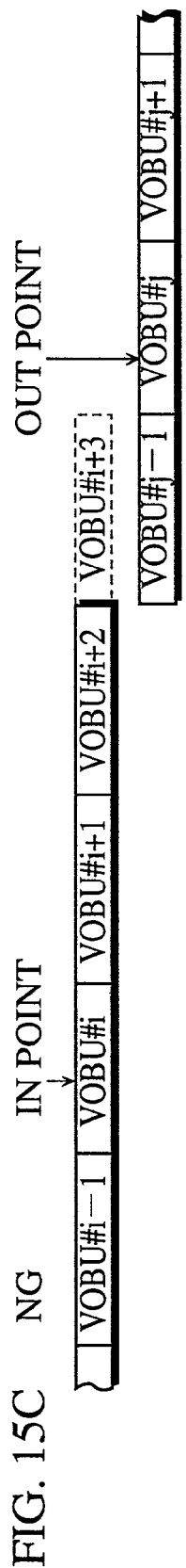
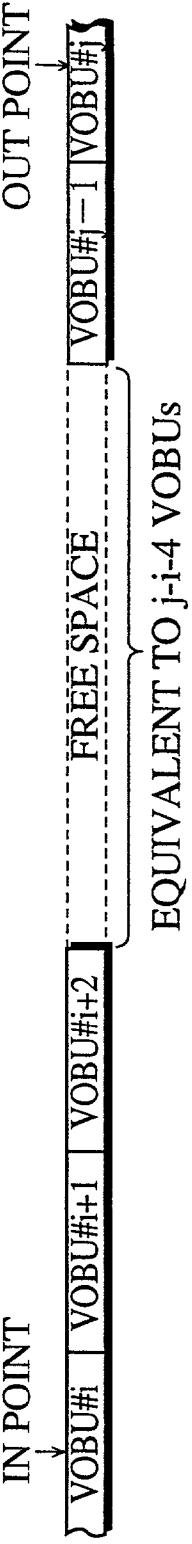
FIG. 15A  NG
FIG. 15B  NG
FIG. 15C  NG
FIG. 15D  OK
FIG. 16

FIG. 23

《MODE SETTING》

⦿ CAPACITY PRIORITY MODE
ACQUIREMENT OF FREE SPACE IS PRIORITIZED

◎ EDITING PRIORITY MODE
FLEXIBILITY IN EDITING IS PRIORITIZED

※PLEASE SELECT MODE

EDITING APPARATUS FOR AN OPTICAL DISK, COMPUTER-READABLE STORAGE MEDIUM, AND COMPUTER PROGRAM

This application is based on application No. 2000-190892 filed in Japan, the content of which is hereby incorporated by reference.

BACKGROUND OF THE INVENTION

1. Field of the Invention

The present invention relates to an editing apparatus for editing video objects recorded on an optical disk such as a DVD-RAM, a DVD-R, a DVD-RW, and a DVD+RW.

2. Background Art

Companies and general users place high expectations on editing apparatuses that have remarkable functions of editing data recorded on a DVD. In reality, such editing apparatuses are subject to several constraints when editing compression-coded data. However, users who believe that "the editing apparatuses are capable of freely editing video data recorded on the DVD" are apt to have various misconceptions about the functions of the editing apparatuses.

SUMMARY OF THE INVENTION

The most problematic misconception relates to partial deletion of video data. In general, the partial deletion is a function of accepting a user indication of a section to be deleted (hereafter referred to as "delete section") and deleting data corresponding to the indicated section. The partial deletion is performed when (1) there is unwanted data on the DVD or (2) the user feels that there is not enough free space on the DVD.

Even though the delete section is indicated by the user, in an MPEG stream which is composed of a plurality of sets of picture data, the indicated section cannot simply be deleted from the DVD. The reason for this is given below.

Picture data included in an MPEG stream has been compression-coded based on correlation with other picture data in the MPEG stream. Accordingly, picture data to be remained on the DVD after partial deletion often has correlation with picture data included in the delete section. Which is to say, when some midsection of the MPEG stream is indicated by the user as the delete section, a portion of the MPEG stream which precedes the delete section and a portion of the MPEG stream which succeeds the delete section both have correlation with picture data in the delete section. Here, if the delete section is short, picture data included in the preceding portion and picture data included in the succeeding portion might even have correlation with the same picture data in the delete section. In this case, to render the preceding portion and the succeeding portion into two independent MPEG streams, it is necessary to copy the picture data included in the delete section and incorporate the copied picture data into each of the MPEG streams corresponding to the preceding and succeeding portions. Due to such copying, the partial deletion for an MPEG stream often results in an increase in data size of the optical disk, despite the user's intention to delete data.

If partial deletion for a short delete section is repeated 10 or 20 times, 10 or 20 sets of picture data will end up being copied, causing the data size to increase more and more rather than decrease. When such a repetition of partial deletion increases the data size and eventually run out of space on the disk, the user would be confused without knowing why the disk is full. The user tends to believe that "free space is automatically generated if partial deletion is repeated". Therefore, when informed by the editing apparatus that the disk has become full after repeated partial deletes, the user may even develop a misplaced doubt about the soundness of the editing apparatus, thinking that "this apparatus is faulty".

Hence the object of the present invention is to provide an editing apparatus that can prevent a shortage of free space on an optical disk caused by partial deletion.

The stated object can be achieved by an editing apparatus for an optical disk on which a video object made up of a plurality of blocks and section information are recorded, each block including a plurality of sets of picture data, and the section information specifying a reproduction section from a set of picture data included in a block to a set of picture data included in another block, the editing apparatus including: a specifying unit operable to specify a set of picture data as a start point of a delete section and another set of picture data as an end point of the delete section in the reproduction section, in accordance with an indication from a user; a judging unit operable to judge whether $j-i-1>u$ or $j-i-1<u$, $j-i-1$ being a total number of blocks present between an ith block which includes the start point and a jth block which includes the end point, i and j being integers, and u being a predetermined integer; a warning unit operable to give a warning to the user, when $j-i-1<u$; and a partial deleting unit operable to rewrite, when $j-i-1>u$, the section information so that part of the reproduction section preceding the delete section and part of the reproduction section succeeding the delete section become two consecutive reproduction sections, and delete blocks from an $(i+s+1)$th block to a $(j-t-1)$th block from the optical disk, s and t being integers that satisfy $u=s+t$.

With this construction, partial deletion is performed only when the block number $j-i-1$ is greater than the predetermined number u (=s+t), so that there is no need to copy part of the delete section. Since no partial deletion is performed when the delete section is short, the user will have no doubt about the soundness of the editing apparatus. This improves the reliability of the editing apparatus for the user.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 15A shows the positional relationship of VOBU #i and VOBU #j where i+2=j;

FIG. 15B shows the positional relationship of VOBU #i and VOBU #j where i+2=j−1;

FIG. 15C shows the positional relationship of VOBU #i and VOBU #j where i+3=j−1;

FIG. 15D shows the positional relationship of VOBU #i and VOBU #j where i+4≦j−1;

FIG. 16 shows a VOB obtained after VOBUs are deleted in step S18 in FIG. 13;

FIG. 23 shows an example of a menu display for mode setting in the second embodiment of the invention;

DESCRIPTION OF THE PREFERRED EMBODIMENTS

First Embodiment

Figure 1:
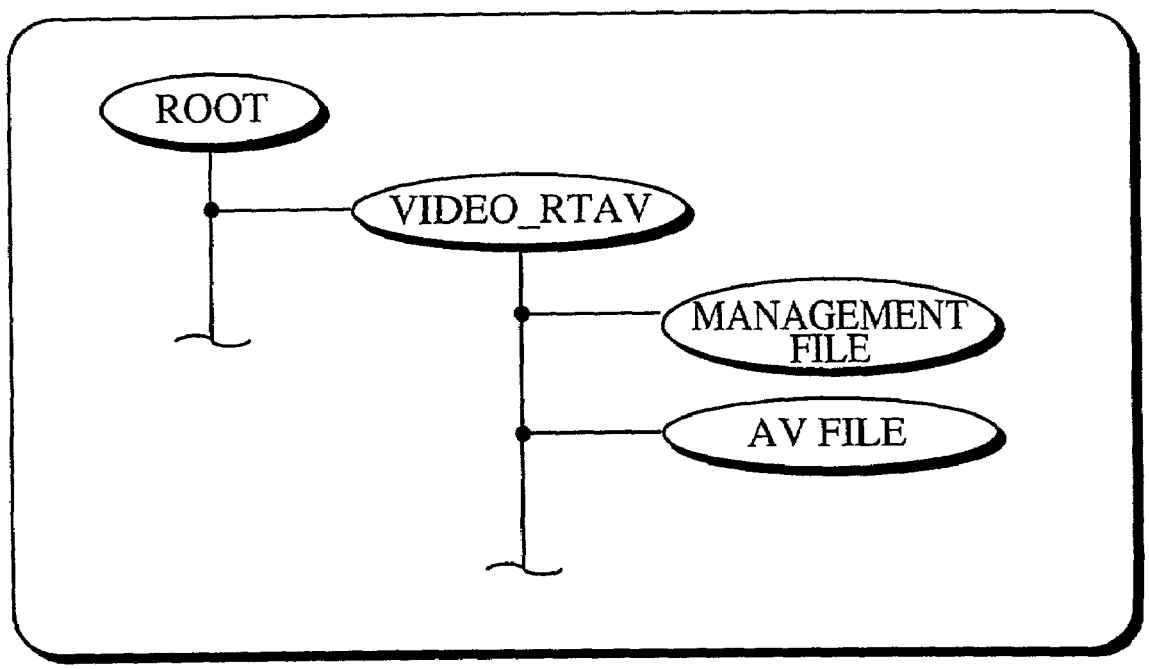
FIG. 1 shows directories and files recorded on a DVD.

The following describes an editing apparatus according to the first embodiment of the invention, by referring to the drawings. First, a DVD which is subjected to editing by the editing apparatus is explained below.

As shown in FIG. 1, directories and files are recorded on the DVD. In the drawing, a VIDEO_RTAV (RealTime Recording Audio Video) directory comes directly below a ROOT directory, and an AV file which contains one or more VOBs and a management file which contains various types of management information come below the VIDEO_RTAV directory.

Figure 2:
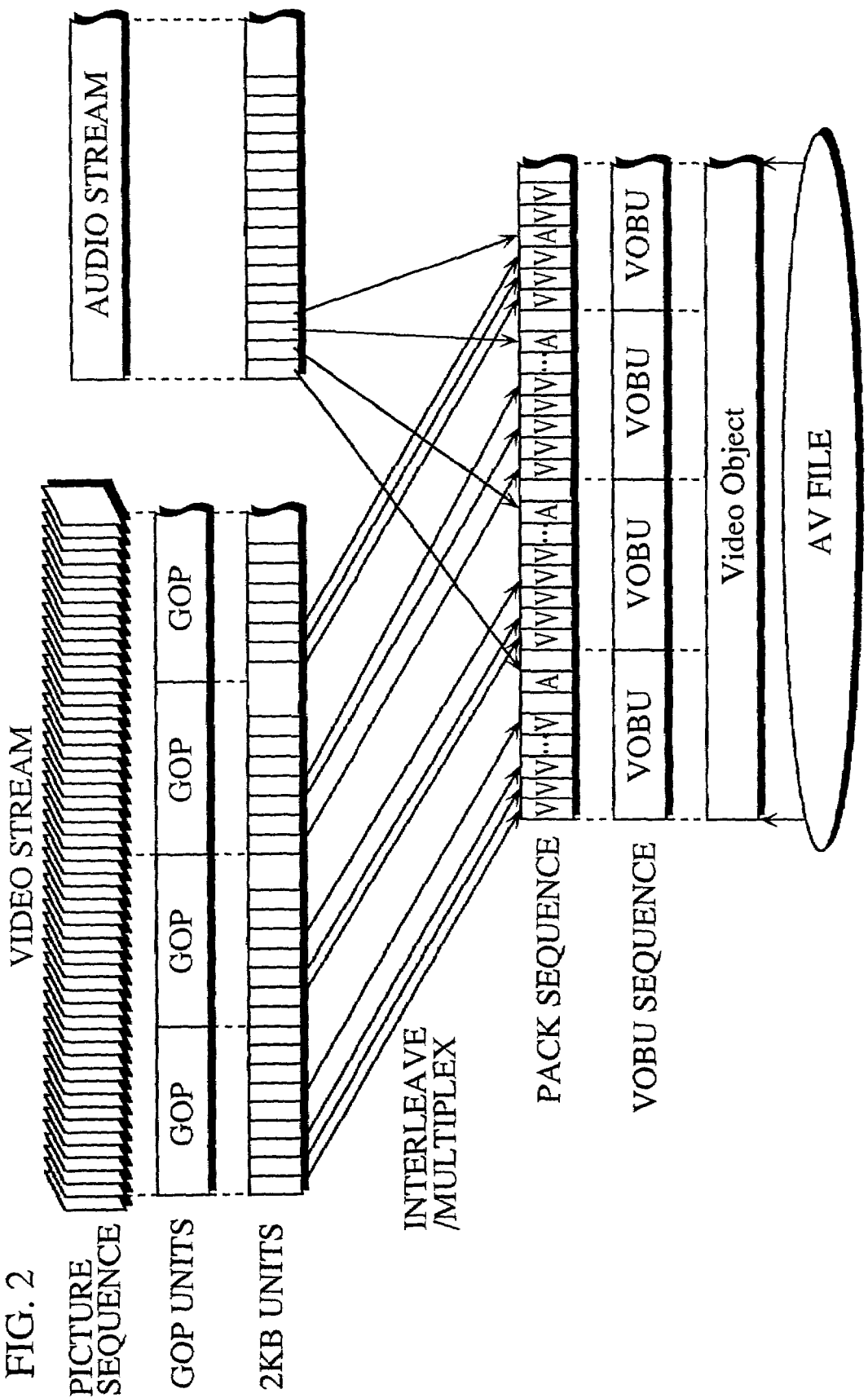
FIG. 2 shows a detailed hierarchy of data structures of a VOB contained in an AV file.

FIG. 2 shows a detailed hierarchy of structures of a VOB contained in the AV file. The VOB (Video Object) is a program stream under ISO/IEC 13818-1 that is obtained by multiplexing a video stream and an audio stream, and that does not have a program_end_code at the end. The video stream located on the top level in FIG. 2 is an arrangement of a plurality of sets of picture data. This picture data sequence is shown divided into a plurality of GOPs on the second level. The picture data for a GOP unit is further divided into 2 KB units on the third level. Similarly, the audio stream located on the right side of the top level is divided into approximately 2 KB units, as shown on the third level. The picture data of the GOPs divided in 2 KB units is then interleaved and multiplexed with the audio data of approximately 2 KB units. This produces the pack sequence on the fourth level. The pack sequence forms a plurality of VOBUs (Video Object Units) that are shown on the fifth level, with the VOB shown on the sixth level being composed of a plurality of these VOBUs arranged in a time series. In FIG. 2, the guidelines drawn using broken lines show the relations between the data in the data structures on adjacent levels. By referring to these guidelines, it can be seen that the VOBUs on the fifth level correspond to the pack sequence on the fourth level and the picture data in GOP units shown on the second level.

As can be seen by tracing the guidelines, each VOBU is a unit that includes at least one GOP that has picture data with a reproduction period of around 0.4 to 1.0 second, as well as audio data that is multiplexed with this picture data. Each VOBU is formed by arranging video packs and audio packs under MPEG standard.

The following explains picture data contained in each GOP. The picture data is converted into any of the three kinds of picture data, namely, Bidirectionally Predictive (B), Predictive (P), and Intra (I) pictures. A B picture results from compression of an image using correlation with both preceding and succeeding images. A P picture results from compression of an image using correlation with preceding images. An I picture results from compression of an image using spatial frequency characteristics within one frame, without referring to other images. Note here that B pictures, P pictures, and I pictures have great variation in their sizes. When decoding a B picture or a P picture that uses correlation with other images, it is necessary to refer to the images that are to be reproduced before or after the picture being decoded. For example, when decoding a B picture, the decoder has to wait until the decoding of succeeding images referred to by the B picture is complete.

Also, there are two types of GOPs, namely, Closed GOPs and Open GOPs. Picture data in a Closed GOP is compression-coded using correlation with picture data included in the same GOP. Meanwhile, P pictures or B pictures in an Open GOP are compression-coded using correlation with picture data included in the immediately preceding GOP and/or the immediately succeeding GOP. Since Open GOPs use correlation with other GOPs, their compression rate is greater than that of Closed GOPs.

Figure 3:
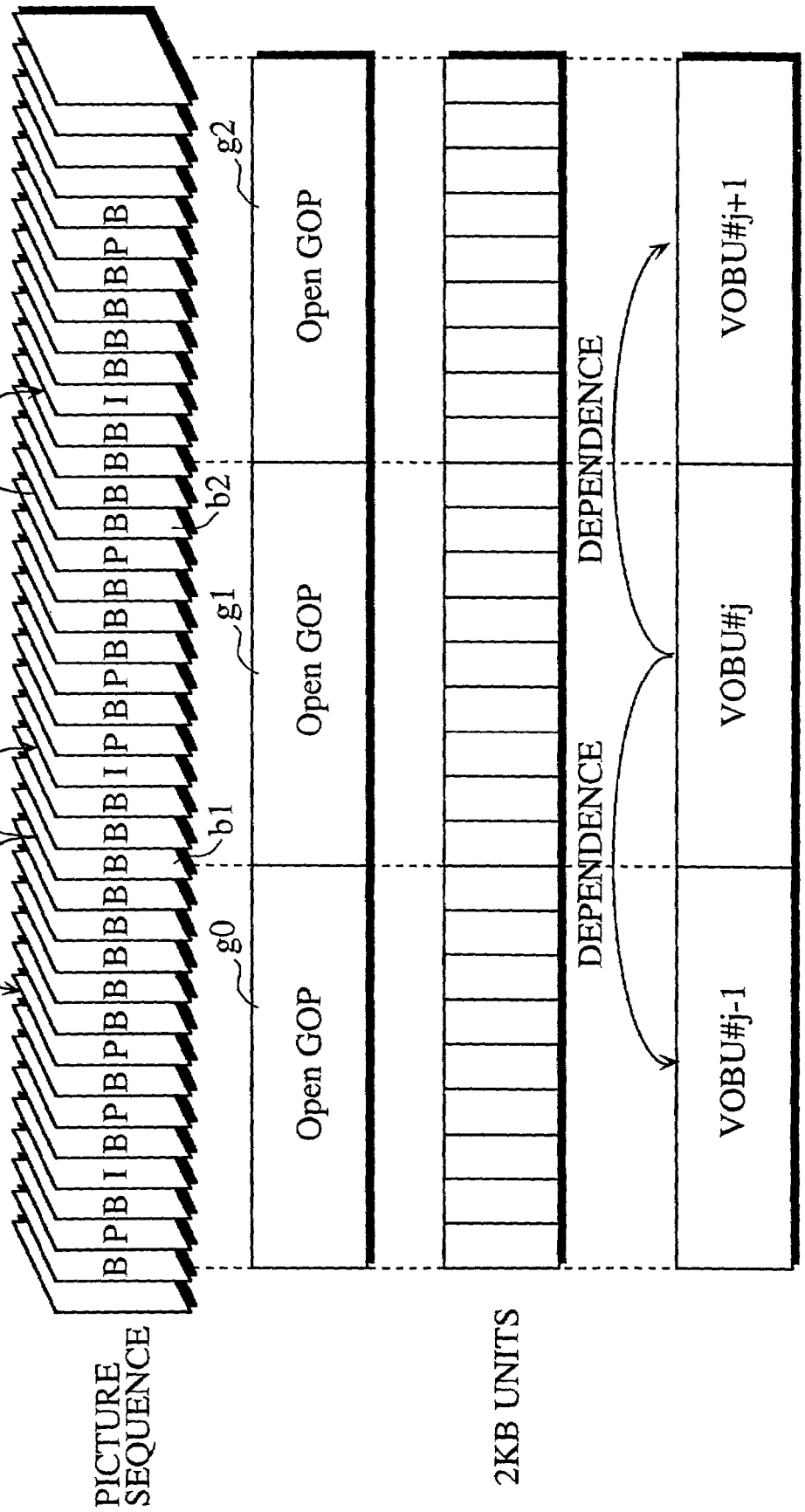
FIG. 3 shows an example of correlation between picture data included in Open GOPs, and dependency between VOBUs.

FIG. 3 shows an example of the correlation between picture data in Open GOPs and the dependence between VOBUs. In the drawing, GOPs g0, g1, and g2 are Open GOPs that belong to VOBU #j−1, VOBU #j, and VOBU #j+1 respectively. In general, Closed GOPs have a structure that starts from an I picture and is followed by P and B pictures. On the other hand, Open GOPs do not necessarily start from an I picture. In FIG. 3, B picture b1 located at the start of GOP g1 has been compression-coded based on correlation sk1 with a P picture in GOP g0 and correlation sk2 with an I picture in GOP g1. Also, B picture b2 in GOP g1 has been compression-coded with correlation sk3 with an I picture in GOP g2. Thus, the picture data in GOP g1 has been compression-coded based on the correlation with the picture data included in the immediately preceding GOP and the picture data included in the immediately succeeding GOP, so that VOBU #j that contains GOP g1 has dependence with both VOBU #j−1 and VOBU #j+1 which precede and succeed VOBU #j, as shown on the fourth level of FIG. 3.

Next explains the dependency relating to synchronous reproduction with audio data. Given that picture data is compression-coded using correlation with other picture data, in most cases the decoder does not reproduce picture data immediately after reading it from the DVD, but has to wait for the decoding of succeeding picture data to be complete. Accordingly, it takes a long time of one second at the maximum, from when picture data is read from the DVD until when the picture data is reproduced. On the other hand, it does not take much time from when audio data is read until when the audio data is reproduced. Therefore, there are cases where picture data in a GOP is reproduced synchronously with audio data which is read from the DVD one second after the reading of the picture data.

Figure 4:
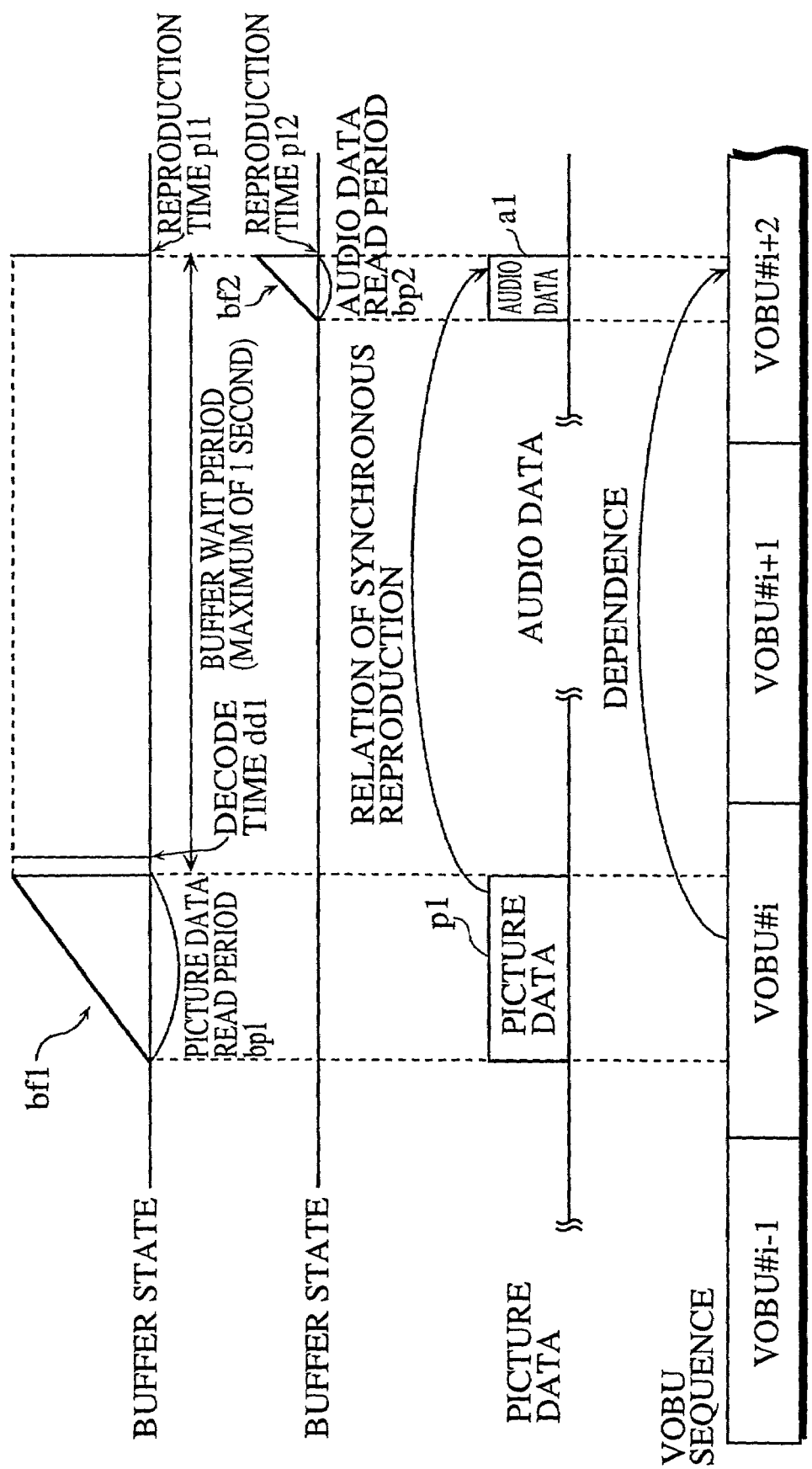
FIG. 4 shows an example where picture data included in one VOBU has dependency with audio data included in another VOBU.

Here, the audio data which is read from the DVD one second after the picture data is likely to belong to the next VOBU or the VOBU after next. Which is to say, there are cases where picture data in one VOBU has dependence with the next VOBU or the VOBU after next. FIG. 4 shows an example where picture data included in one VOBU has dependence with audio data included in another VOBU. In the drawing, picture data p1 included in VOBU #i is read from the DVD during period bp1 and stored in a buffer in the DVD player as shown by arrow bf1. However, picture data p1 is not decoded until decode time dd1 and is not reproduced until reproduction time pl1, so that picture data p1 will be reproduced synchronously with audio data a1 which is read from the DVD at reproduction time pl1 (audio data a1 is read from the DVD during period bp2 and stored in the buffer in the DVD player). Since picture data p1 belongs to VOBU #i whilst audio data a1 belongs to VOBU #i+2, VOBU #i has a dependent relationship with VOBU #i+2.

Figure 5:
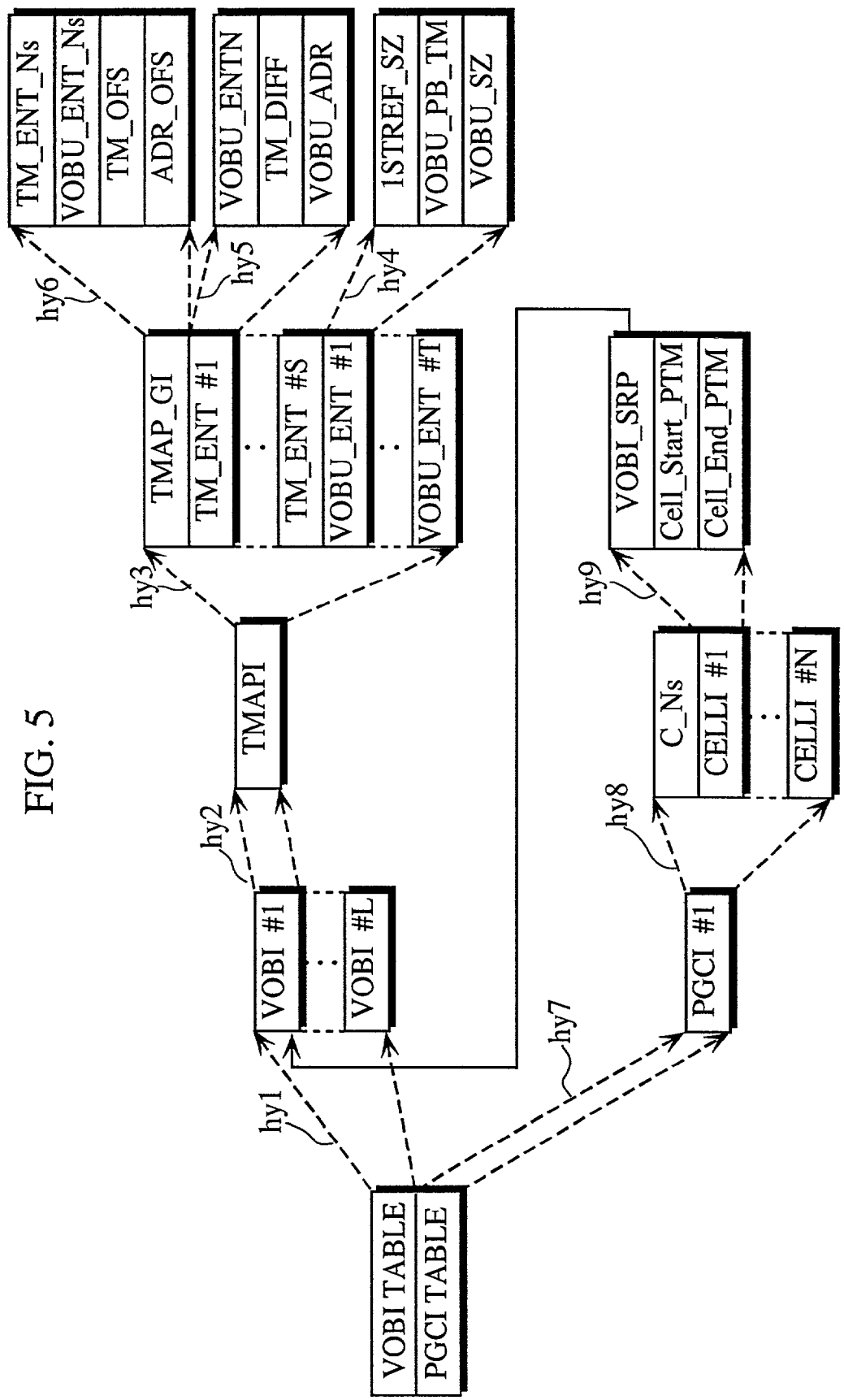
FIG. 5 shows an inner structure of a management file.

The management file is explained next. FIG. 5 shows a structure of the management file. As illustrated, the management file is made up of a VOBI table and a PGCI table. The VOBI table includes VOB information (VOBI) #1 to #L which have a one-to-one correspondence with the VOBs included in the AV file, as shown by dotted arrow hy1. Each VOBI includes a TMAPI as shown by dotted arrow hy2. The TMAPI includes a TMAP_GI, TM_ENTs #1 to #S, and VOBU_ENTs #1 to #T, as shown by dotted arrow hy3.

VOBU_ENTs #1 to #T are information corresponding to each VOBU included in a VOB. As indicated by dotted arrow hy4, each VOBU_ENT includes a 1STREF_SZ showing a size of an I picture located at the start of the corresponding VOBU, a VOBU_PB_TM showing a reproduction period of the VOBU, and a VOBU_SZ showing a size of the VOBU. TM_ENTs #1 to #S are information showing the locations of time entries at intervals of ten seconds. As indicated by dotted arrow hy5, each TM_ENT includes a VOBU_ENTN showing a VOBU that includes the time entry, a TM_DIFF showing an offset time from the start of the VOBU shown by the VOBU_ENTN to the time entry, and a VOBU_ADR showing offset data from the start of the VOB to the start of the VOBU shown by the VOBU_ENTN.

The TMAP_GI is information for managing the TMAPI in its entirety. As indicated by dotted arrow hy6, the TMAP_GI includes a TM_ENT_Ns showing the number of time entries set in the VOB, a VOBU_ENT_Ns showing the number of VOBU_ENTs included in the TMAPI, a TM_OFS showing an offset from the start of the VOB to one time entry, and an ADR_OFS showing an offset from the start of the AV file to the start of the VOB.

Figure 6:
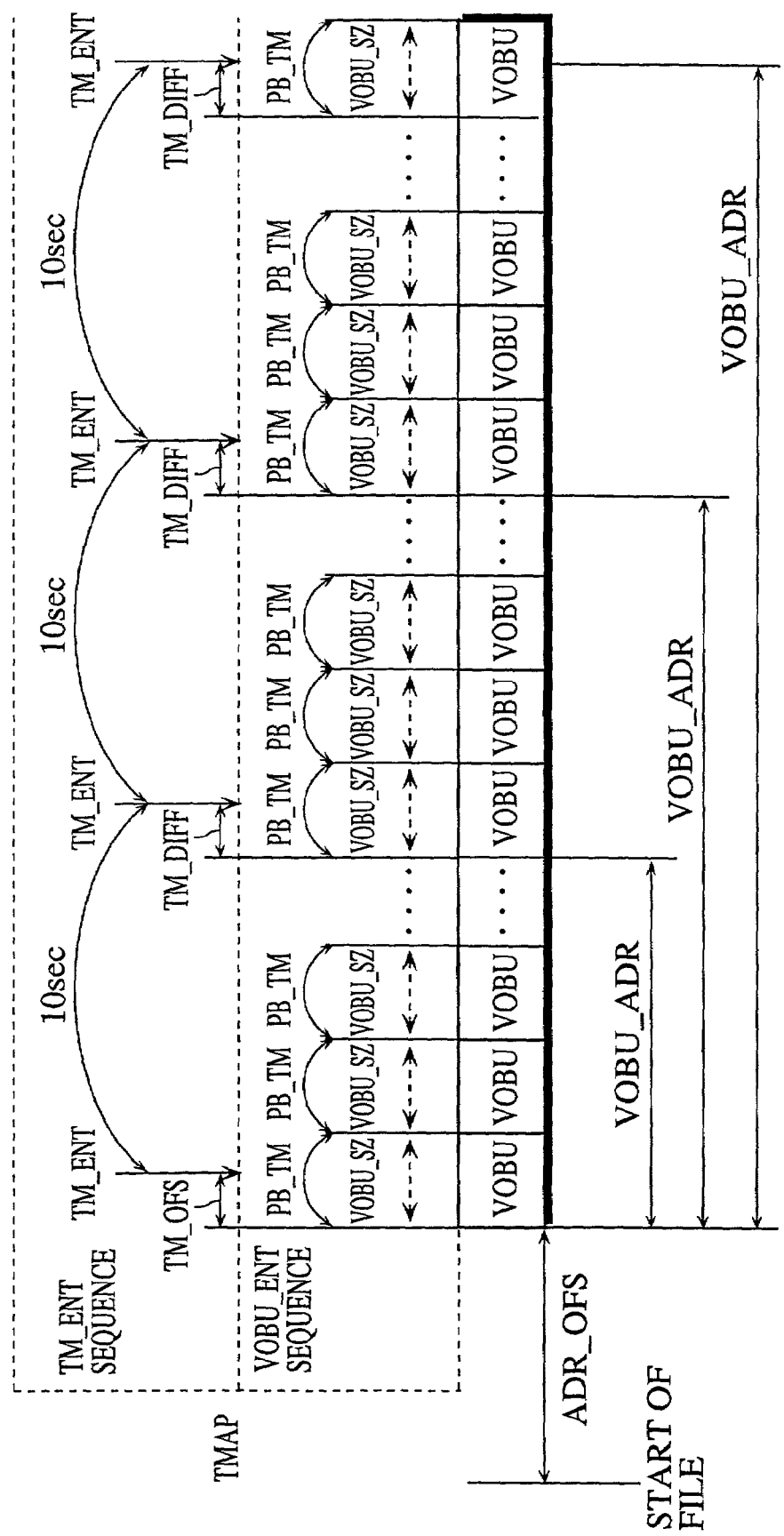
FIG. 6 is a schematic view showing the relation between a TMAPI and VOBUs.

FIG. 6 is a schematic view showing the relation between the TMAPI and the VOBUs. As shown in the drawing, the correspondence between the reproduction period and size of each VOBU is defined by a combination of a VOBU_PB_TM (PB_TM in the drawing) and a VOBU_SZ. Also, a TM_DIFF in each TM_ENT indicates how many seconds it takes from the start of reproduction of a VOBU to a time entry. With this structure of the TMAPI, it is possible to specify which VOBU corresponds to a given time code.

The following explains the PGCI table by referring to FIG. 5. The PGCI table includes at least one PGCI as shown by dotted arrow hy7. Each PGCI includes a C_Ns showing the number of Cells included in a PGC corresponding to the PGCI, and CELLIs #1 to #N which are information corresponding to each Cell, as indicated by dotted arrow hy8. Each CELLI includes a VOBI_SRP showing a corresponding VOBI, and a Cell_Start_PTM and Cell_End_PTM showing which part of a VOB is specified as the Cell, as indicated by dotted arrow hy9. In this embodiment, a Cell is a reproduction section defined by a combination of time codes, and a PGC is a reproduction route which includes one or more reproduction sections.

Figure 7:
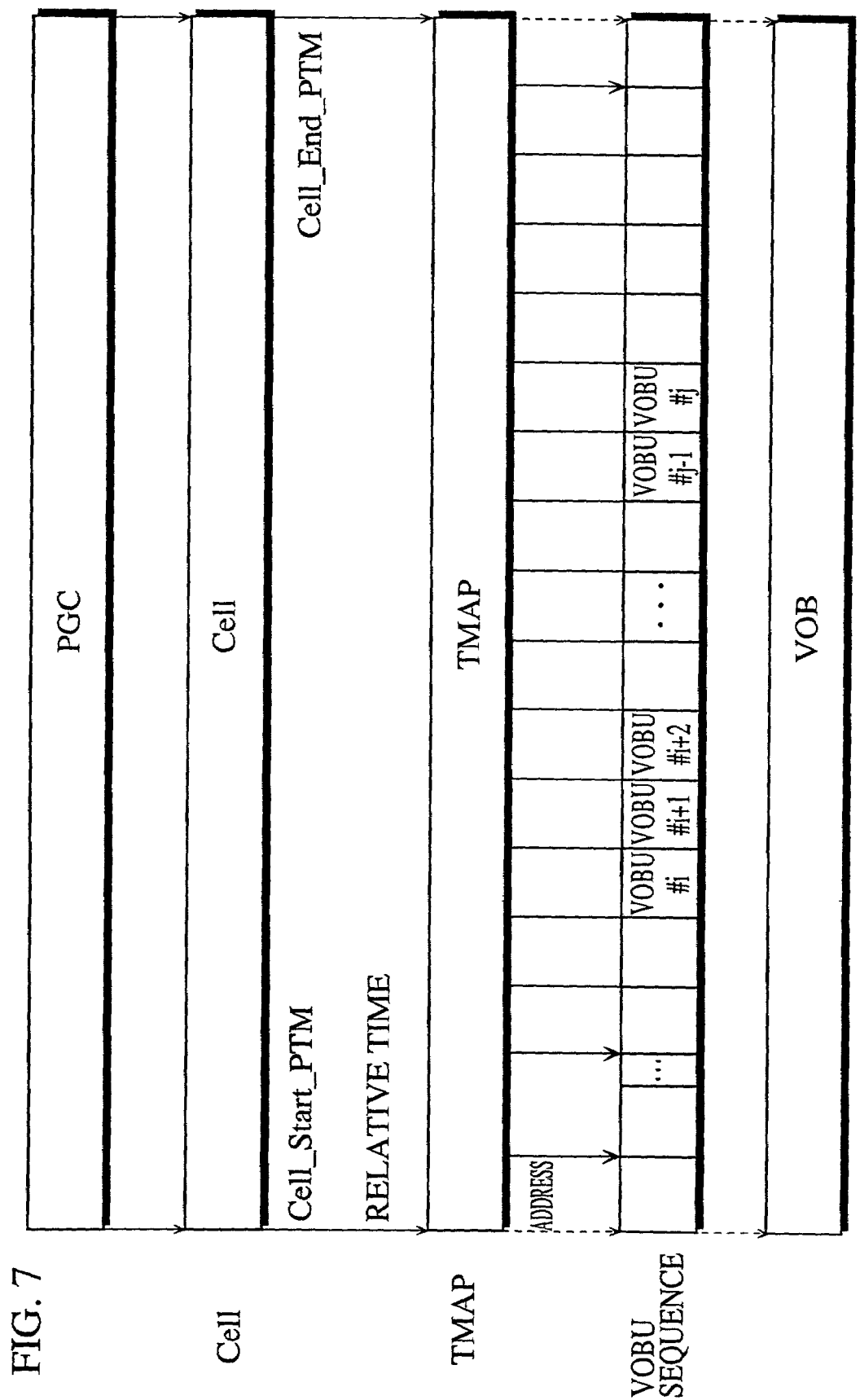
FIG. 7 shows a hierarchical structure of reproduction units of the DVD.

FIG. 7 shows a hierarchical structure of the reproduction units of the DVD. In the drawing, a combination of a Cell_Start_PTM and a Cell_End_PTM included in a CELLI designates a start point and end point of a Cell. A PGC which contains this Cell is specified by a PGCI, and defines a reproduction route for the Cell. This completes the explanation of the DVD.

Figure 8:
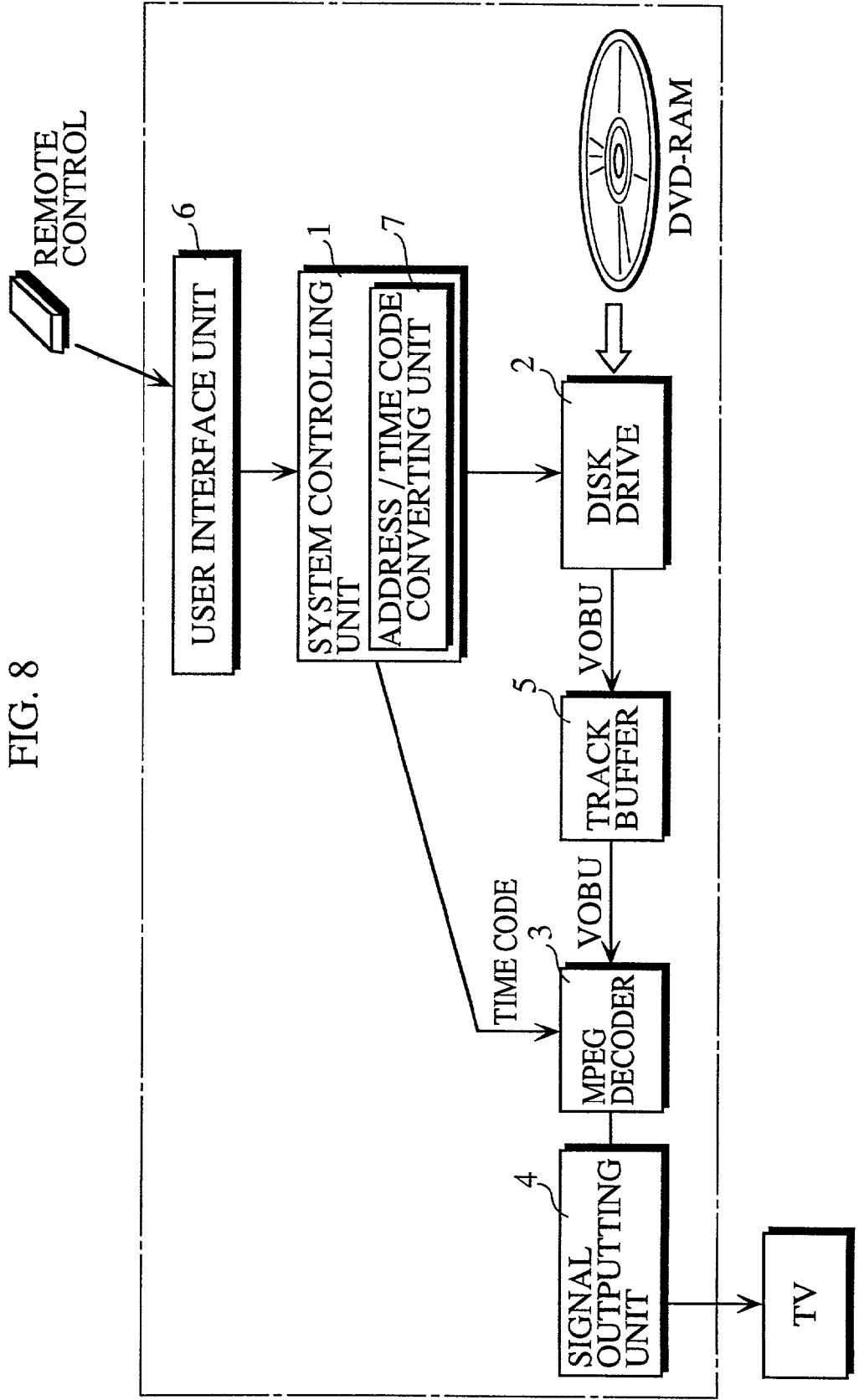
FIG. 8 shows an inner construction of an editing apparatus to which the embodiments of the invention relate.

The following explains the editing apparatus. FIG. 8 shows an internal construction of the editing apparatus to which the embodiments of the invention relates. In the drawing, the editing apparatus is roughly made up of a system controlling unit 1 (including an address/time code converting unit 7), a disk drive 2, an MPEG decoder 3, a signal outputting unit 4, a track buffer 5, and a user interface unit 6.

The system controlling unit 1 accepts an indication of a reproduction point from the user. When the reproduction point is indicated, the system controlling unit 1 specifies which of the VOBUs included in the VOB contains the reproduction point and which of a plurality of sets of picture data included in the VOBU corresponds to the reproduction point, by referring to the TMAPI. The system controlling unit 1 then instructs the disk drive 2 to read the specified VOBU, and instructs the MPEG decoder 3 to display only the specified picture data of the read VOBU. If two reproduction points are set as a start point (IN point) and end point (OUT point) of a delete section and partial deletion is requested, the system controlling unit 1 updates the management file and the AV file so as to render the preceding and succeeding portions of the delete section into two independent VOBs, TMAPIs, and Cells.

Figure 9:
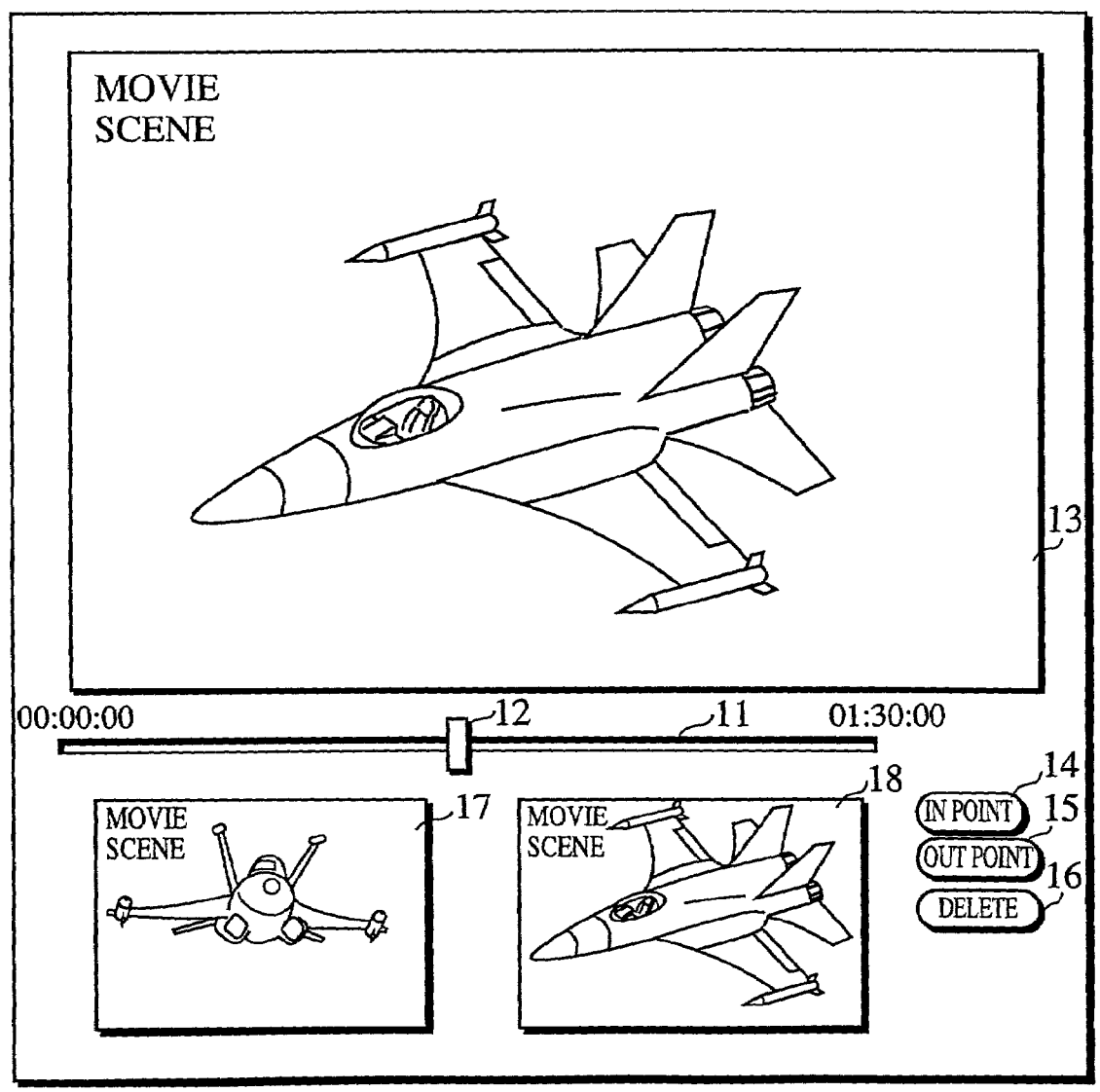
FIG. 9 shows an example of an interactive display used in an editing operation.

The above indication of the reproduction points, setting of the IN and OUT points, and partial deletion are conducted through an interactive display such as that shown in FIG. 9. FIG. 9 shows an example of an interactive display used in editing. This interactive display includes a rail 11, a slide bar 12, a playback window 13, an IN button 14, an OUT button 15, a delete button 16, an IN point thumbnail window 17, and an OUT point thumbnail window 18. The slide bar 12 moves on the rail 11 in accordance with the user's operations of cursor keys. Once the position of the slide bar 12 has been determined, the system controlling unit 1 reads the position of the slide bar 12 on the rail 11 as a reproduction point. For instance, when the VOB is two hours long and the position of the slide bar 12 is set about midway through the rail 11, the system controlling unit 1 interprets a point one hour after the start of the VOB, as the reproduction pint.

The playback window 13 displays picture data located at the reproduction point. The IN button 14 and the OUT button 15 are buttons that accept the setting of the IN and OUT points, and the delete button 16 is a button that accepts the user's request to delete the delete section. The thumbnail windows 17 and 18 are windows for displaying thumbnail images of picture data located at the IN and OUT points, respectively.

The disk drive 2 is a device that mounts and accesses the DVD. When reproducing picture data, the disk drive 2 controls the DVD to read a VOBU which includes the picture data. When partially deleting the VOB, the disk drive 2 updates the management information of the AV file so as to delete a part which does not belong to any of the two VOBs generated as a result of the partial deletion.

The MPEG decoder 3 decodes the VOBU read from the DVD by the disk drive 2, when the reproduction of the picture data is instructed. The MPEG decoder 3 thereby obtains image signals, and outputs only image signals corresponding to a time code outputted from the system controlling unit 1.

The signal outputting unit 4 outputs the image signals outputted from the MPEG decoder 3, to a TV or the like connected to the editing apparatus.

The track buffer 5 is a buffer for smoothing out discrepancies between the speed of reading VOBUs from the DVD by the disk drive 2 and the speed of decoding picture data by the MPEG decoder 3. So long as no overflow or underflow occurs in the track buffer 5, seamless reproduction of a plurality of sets of picture data is possible.

The user interface unit 6 accepts operations, such as an operation of indicating the IN button 14 and the OUT button 15, an operation of indicating the slide bar 12, an operation of moving the slide bar 12, and an operation of executing partial deletion, through a remote control or a key panel. To accept these operations through the remote control, the user interface unit 6 operates as follows. The user interface unit 6 accepts the above movement and indication operations through a right cursor key, a left cursor key, and an Enter key equipped in a general remote control. More specifically, with the pressing of the right cursor key, the user interface unit 6 moves the cursor in the order of the slide bar 12→the IN button 14→the OUT button 15→the delete button 16→the slide bar 12. With the pressing of the left cursor key, the user interface unit 6 moves the cursor in the order of the delete button 16→the OUT button 15→the IN button 14→the slide bar 12→the delete button 16. If the Enter key is pressed when the cursor is located at the IN button 14, the OUT button 15, or the delete button 16, the button at which the cursor is located is selected.

Meanwhile, if the Enter key is pressed when the cursor is at the slide bar 12, the slide bar 12 is selected. By pressing the left and right cursor keys after the slide bar 12 is selected, the slide bar 12 is moved sideways (this is called "slide bar move operation"). This embodiment describes the case where the editing apparatus is a consumer product which accepts user operations through a remote control. However, if the editing apparatus is a personal computer which accepts user operations through input devices typical of personal computers such as a mouse, a pad, and a trackball, these user operations may be accepted through clicking or dragging.

Figure 10:
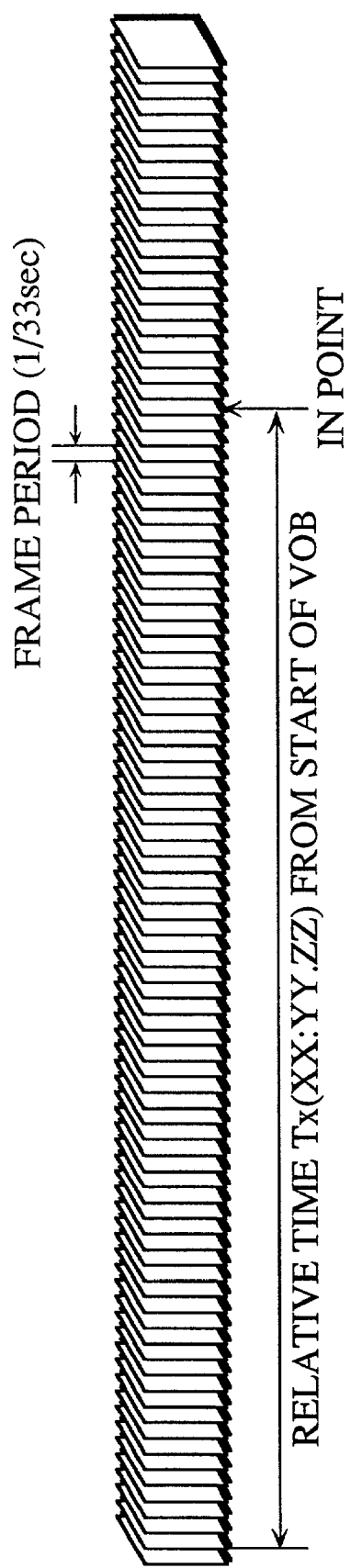
FIG. 10 shows a process of specifying an address of a VOBU from a time code by an address/time code converting unit shown in FIG. 8.
Figure 11:
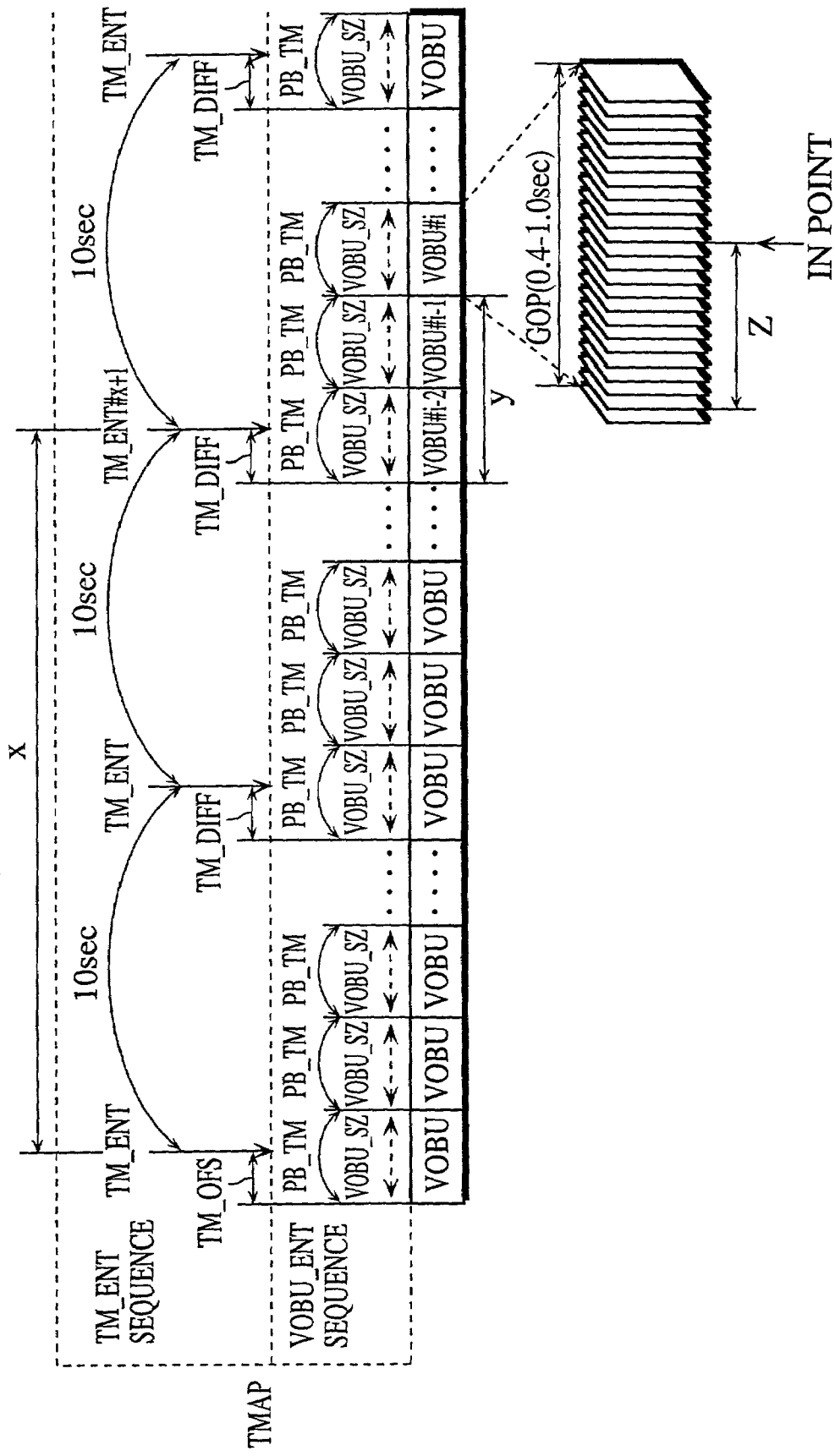
FIG. 11 shows the process of specifying an address of a VOBU from a time code by the address/time code converting unit.
Figure 12:
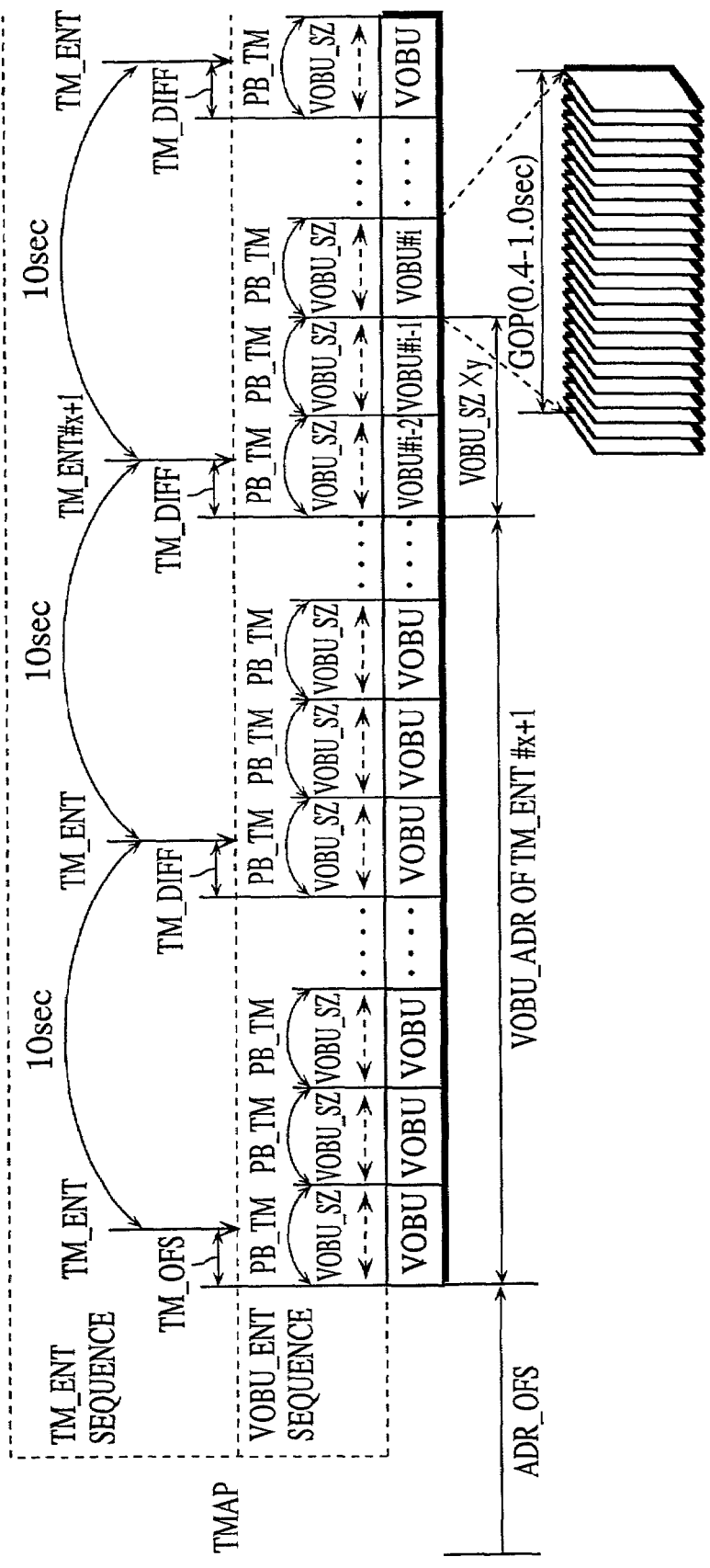
FIG. 12 shows the process of specifying an address of a VOBU from a time code by the address/time code converting unit.

The address/time code converting unit 7 specifies an address of a VOBU in the AV file using a time code. The time code may be a time code for indicating a reproduction point, a time code for indicating the IN point of a delete section, or a time code for indicating the OUT point of the delete section. When the user makes an indication, the address/time code converting unit 7 specifies which VOBU includes the indicated time code and which picture data of the VOBU corresponds to the time code, with reference to the TMAPI. FIGS. 10–12 show a process of specifying an address of a VOBU from a time code by the address/time code converting unit 7. This process is explained below, taking the IN point as an example. As shown in FIG. 10, when the IN point is indicated by relative time Tx from the start of the VOB, x, y, and z which satisfy Equation 1 are computed as shown in FIG. 11.

$$(\text{IN point time code Tx}) = \\ 10\sec \times x - (\text{TM\_DIFF of TM\_ENT}\#x + 1) + \\ \text{TM\_OFS} + (\text{VOBU\_PB\_TM}) \times y + z \quad \text{(Equation 1)}$$

Once x and y have been found, x and y are assigned to Equation 2 to obtain an address of VOBU #i, as shown in FIG. 12.

$$(\text{Address of VOBU } \#i) = \text{ADR\_OFS} + \\ (\text{VOBU\_ADR of TM\_ENT } \#x + 1) + \text{VOBU\_SZ} \times y \quad \text{(Equation 2)}$$

The VOBU is then read from the obtained address of the DVD. If the system controlling unit 1 instructs to reproduce picture data which appears when period z passes after the reproduction start time of the VOBU, picture data corresponding to the IN point is displayed.

Figure 13:
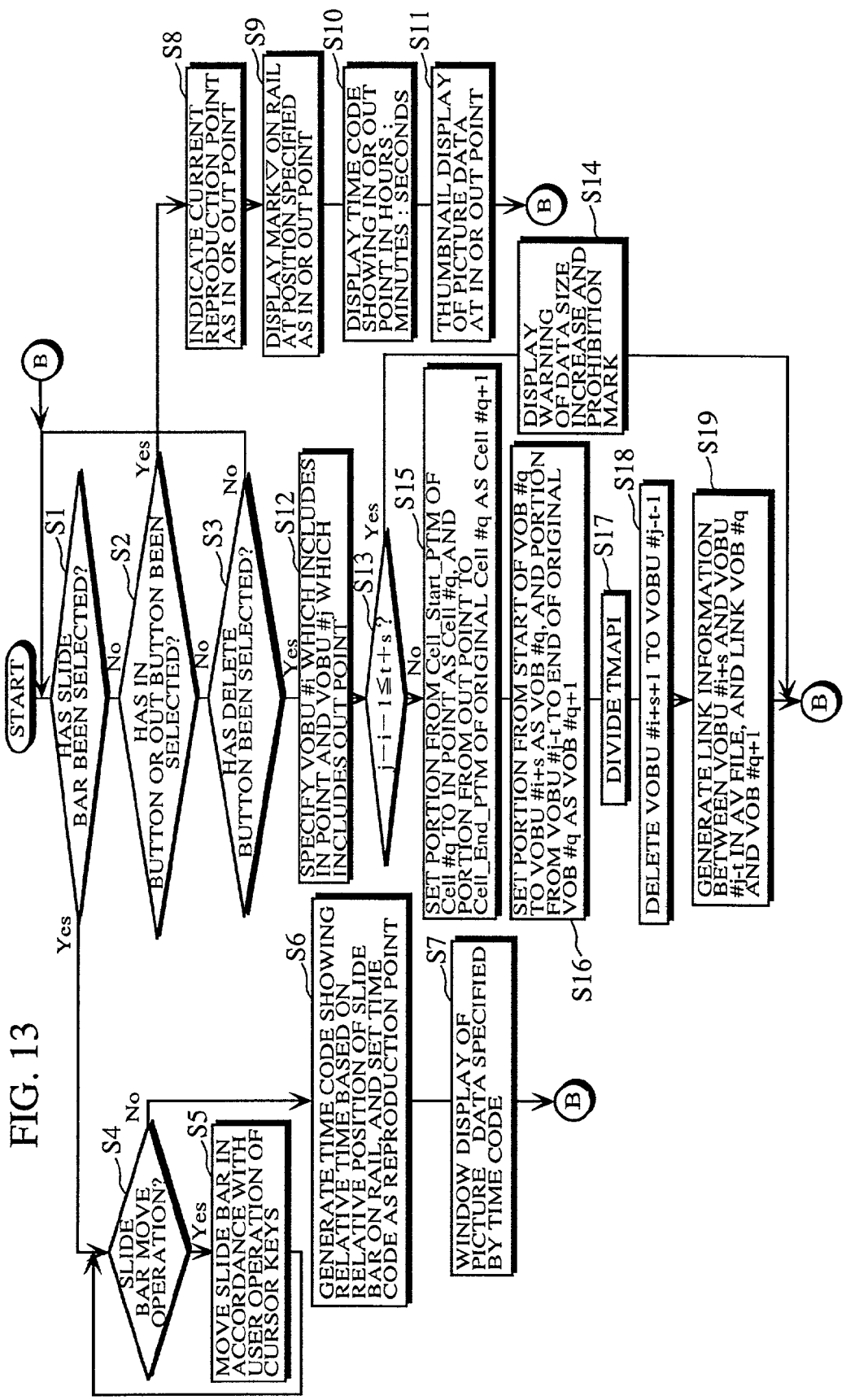
FIG. 13 is a flowchart showing an editing operation of the editing apparatus in the first embodiment.

An editing operation of the above constructed editing apparatus is realized when the system controlling unit 1 executes a procedure shown in FIG. 13. The editing operation of the editing apparatus is explained below with reference to the drawing.

When the editing apparatus is activated, a loop of steps S1–S3 is performed. This loop is to wait until the slide bar 12, the IN button 14, the OUT button 15, or the delete button 16 is selected. When the slide bar 12 is selected, the operation proceeds from step S1 to step S4, to wait for a slide bar move operation. In step S5, the slide bar 12 is moved in accordance with the slide bar move operation. As long as the user continues the slide bar move operation, the slide bar 12 is moved sideways in steps S4 and S5. When the slide bar move operation is stopped, the procedure proceeds from step S4 to step S6, where a time code is generated based on a relative position of the slide bar 12 with respect to the left end of the rail 11. This time code is set as a reproduction point. Suppose a Cell which is subjected to editing is 1.5 hours long, and the left end of the rail 11 is 00 hour:00 min:00.00 sec and the right end of the rail 11 is 01 hour: 30 min: 00.00 sec, with the position of the slide bar 12 on the rail 11 being expressed in hours, minutes, and seconds. If the slide bar 12 is positioned midway through the rail 11, then the reproduction point is 00 hour:45 min:00.00 sec.

After this, picture data specified by the time code is displayed on the playback window 13 in step S7. In this way, a given reproduction point in the delete section is specified by the slide bar move operation. The procedure then goes to the loop of steps S1–S3. If a desired reproduction point could not be indicated by the slide bar move operation, the user reselects the slide bar 12 in step S1 and repeats the slide bar move operation in steps S4 and S5, to make fine adjustments for the position of the reproduction point.

Assume the desired reproduction point is indicated through the adjustments and the IN button 14 is pressed. In step S8 the reproduction point is set as the IN point, and in step S9 the mark ∇ is displayed at the position specified as the IN point on the rail 11. In step S10 the time code showing the IN point is displayed in hours:minutes:seconds, and in step S11 a thumbnail image of picture data at the IN point is displayed on the thumbnail window 17. This completes the setting of the IN point. After this, by reselecting the slide bar 12, performing a slide bar move operation, and selecting the OUT button 15, the OUT point is set in the same way as the IN point.

Figure 14:
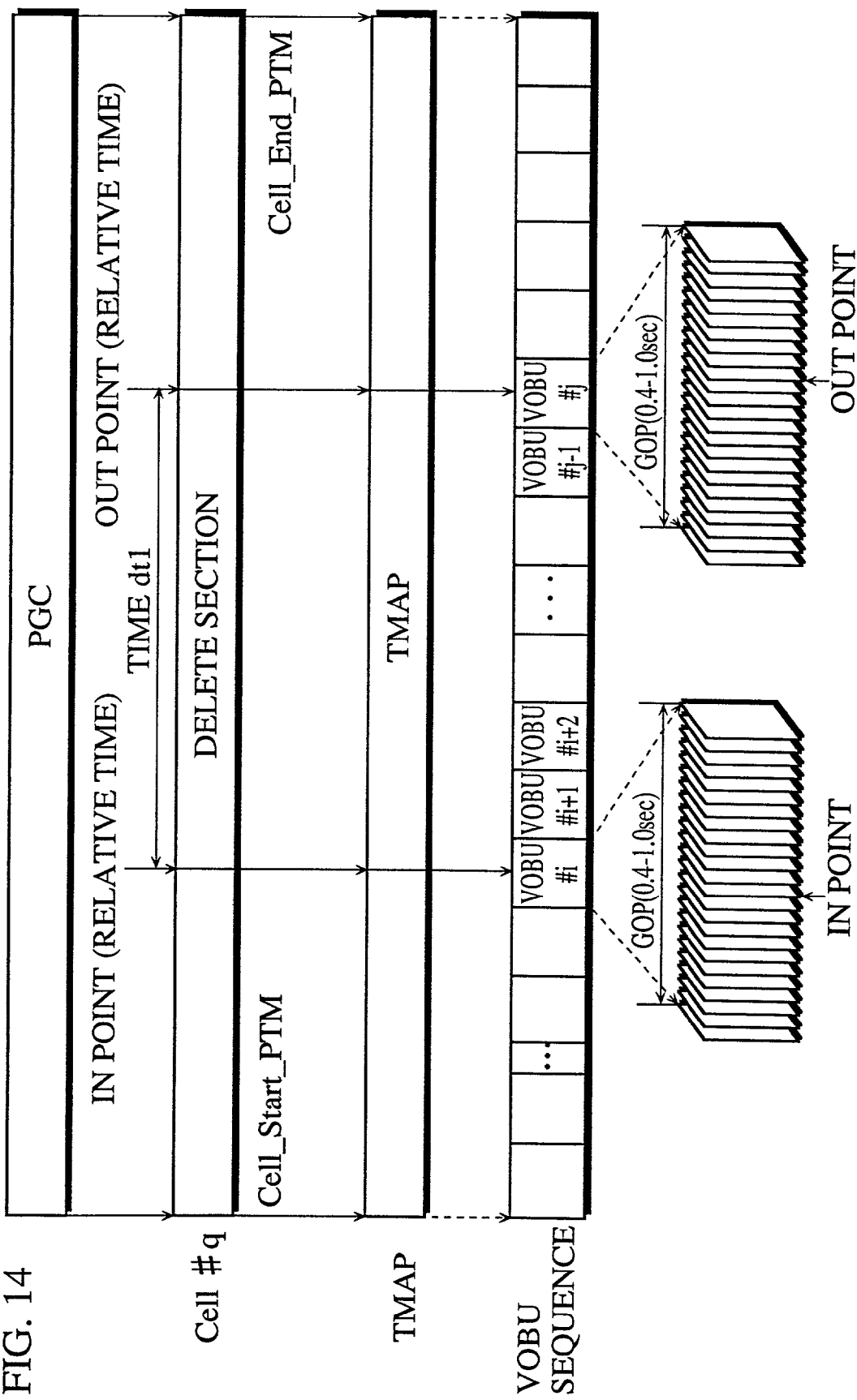
FIG. 14 shows how a delete section is set for the reproduction units with the hierarchical structure shown in FIG. 7.

As a result of setting the IN and OUT points, the delete section is determined. Following this, when the procedure goes to the loop of steps S1–S3 and the delete button 16 is selected, the procedure advances to step S12, where VOBU #i which contains the IN point and VOBU #j which contains the OUT point are specified. FIG. 14 shows how the delete section is set for the reproduction units having the hierarchical structure of FIG. 7. The delete section from the IN point to the OUT point has time length dt1, and is included in Cell #q. Also, picture data corresponding to the IN point is included in VOBU #i, whereas picture data corresponding to the OUT point is included in VOBU #j. After the IN and OUT points are set in such a way, it is judged in step S13 whether a relationship j−i−1≦t+s holds between VOBU #i and VOBU #j.

Several relations between VOBU #i and VOBU #j are illustrated in FIGS. 15A–15D, where t=1 and s=2. FIG. 15A shows the positional relationship of VOBU #i and VOBU #j when i+2=j. In this case, VOBU #i+1 and VOBU #i+2 overlap VOBU #j−1 and VOBU #j, respectively. This being so, to delete the specified delete section, it is necessary to copy VOBU #j−1 and VOBU #j. Since the deletion of the delete section is accompanied by the copying of the VOBUs, the procedure advances to step S14 to display a warning of a data size increase together with a prohibition mark.

FIG. 15B shows the positional relationship of VOBU #i and VOBU #j when i+2=j−1. In this case, VOBU #i+2 overlaps VOBU #j−1,so that deleting the specified delete section requires VOBU #j−1 to be copied. Since the deletion of the delete section is accompanied by the copying of the VOBU, the procedure advances to step S14 to display the warning and the prohibition mark, as in FIG. 15A.

FIG. 15C shows the positional relationship of VOBU #i and VOBU #j when i+3=j−1. In this case, deleting the specified delete section does not require any VOBU to be copied and therefore does not cause a data size increase. However, the user is likely to be confused if the data size does not decrease despite the deletion. Accordingly, the deletion is in principle prohibited in this case, too.

FIG. 15D shows the positional relationship of VOBU #i and VOBU #j when i+4≦j−1. In this case, deleting the specified delete section frees at least one VOBU, thereby increasing free space on the DVD. Accordingly, the procedure proceeds to steps S15–S18 to execute the deletion of the delete section. To be more specific, a portion from a Cell_Start_PTM of Cell #q to the IN point is set as Cell #q, and a portion from the OUT point to a Cell_End_PTM of original Cell #q is set as Cell #q+1 in step S15. Also, a portion from the start of VOB #q to VOBU #i+s is set as VOB #q, and a portion from VOBU #j−t to the end of original VOB #q is set as VOB #q+1 in step S16. Following this, the TMAPI is divided in step S17, and VOBUs #i+s+1 to #j−t−1 are deleted in step S18. FIG. 16 shows the VOBUs obtained after step S18. As illustrated, j−i−4 VOBUs between VOBU #i+2 and VOBU #j−1 have been deleted.

Figure 17:
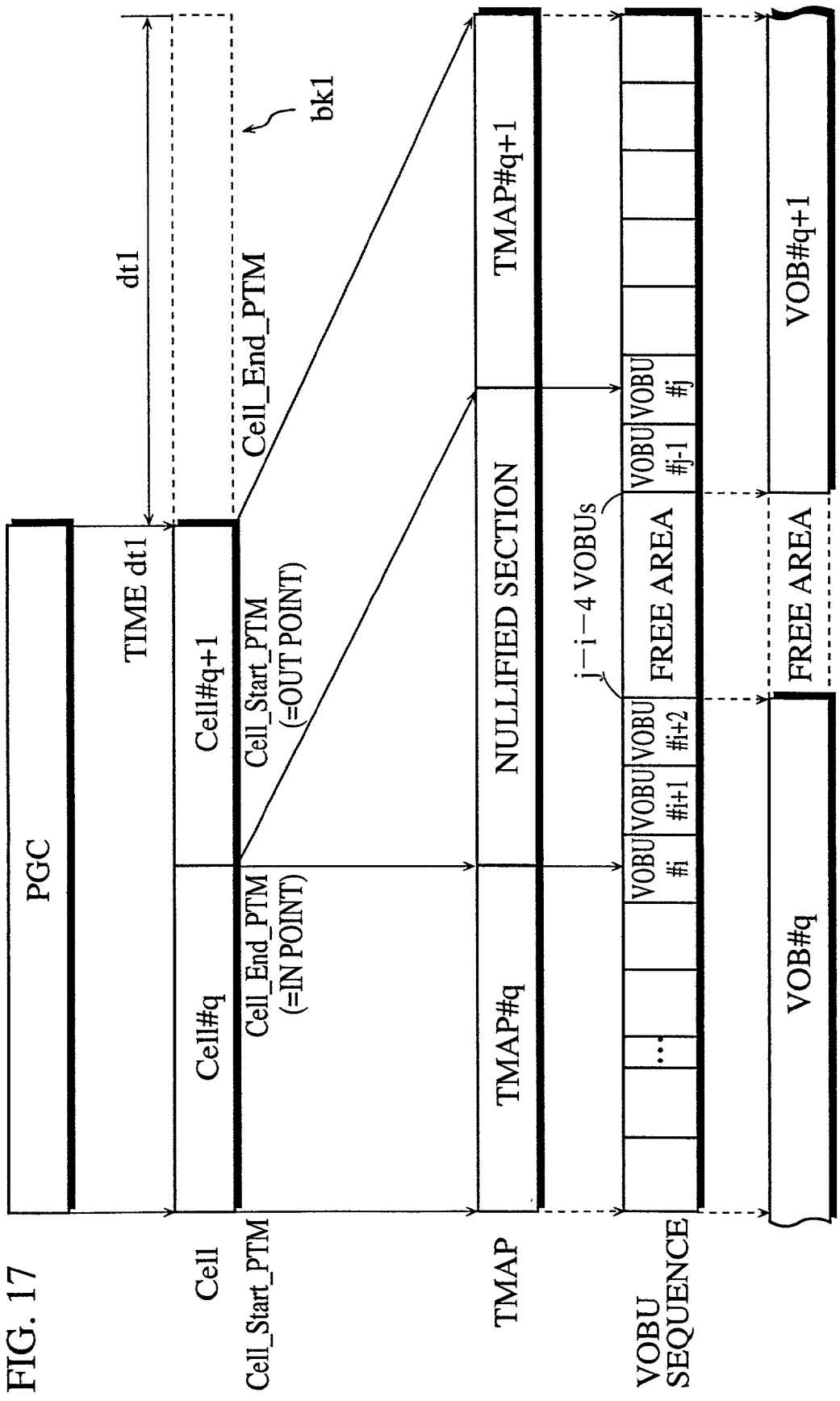
FIG. 17 shows a hierarchical structure of the reproduction units after partial deletion.

FIG. 17 shows a hierarchical structure after the partial delete operation. The part of Cell #q preceding the delete section has become new Cell #q and the part of original Cell #q succeeding the delete section has become new Cell #q+1,as a result of step S15. A Cell_End_PTM of new Cell #q is at the IN point, and a Cell_Start_PTM of new Cell #q+1 is at the OUT point. Hence Cell #q and Cell #q+1 form two consecutive reproduction sections. As a result that the delete section was deleted and its preceding and succeeding sections were made consecutive, the reproduction period of the PGC that includes Cell #q and Cell #q+1 has shortened by time length dt1, as shown by dotted line bk1.

Also, the part of the TMAPI corresponding to the delete section has been nullified, and its preceding part and succeeding part have been updated respectively to TMAPI #q and TMAPI #q+1, as a result of step S17. Furthermore, the first VOBU of VOB #q to VOBU #i+2 have become new VOB #q, and VOBU #j−1 to the last VOBU of original VOB #q have become new VOB #q+1,as a result of step S18. Here, the i−j−4 VOBUs from VOBU #i+3 to VOBU #j−2 have become free space, thereby allowing new data to be recorded there.

Once the above partial deletion has completed, link information between VOBU #i+2 and VOBU #j−1 in the AV file is generated to link VOB #q and VOB #q+1, in step S19.

Figure 18A:
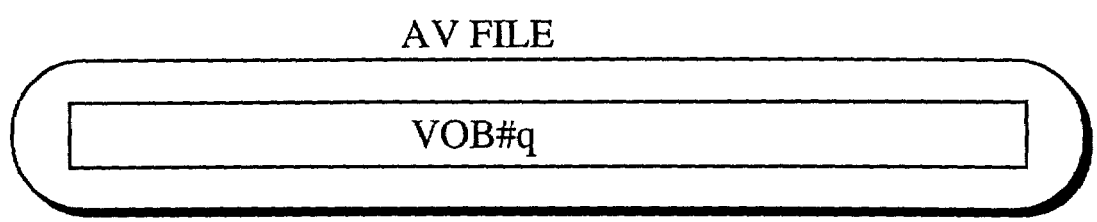
FIGS. 18A–18C show a transition of the contents of an AV file when VOBUs are deleted.
Figure 18B:
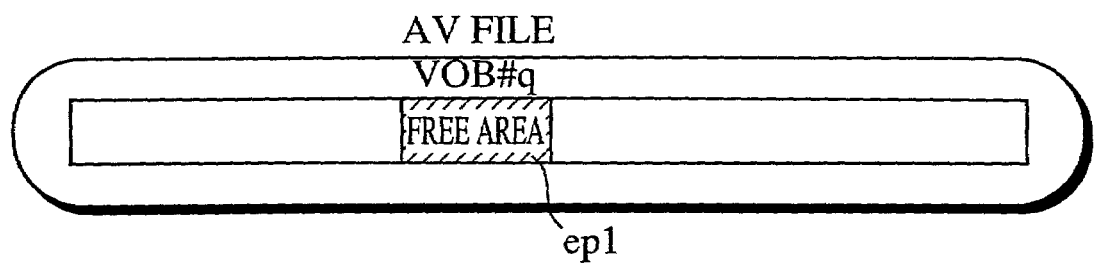
Figure 18C:
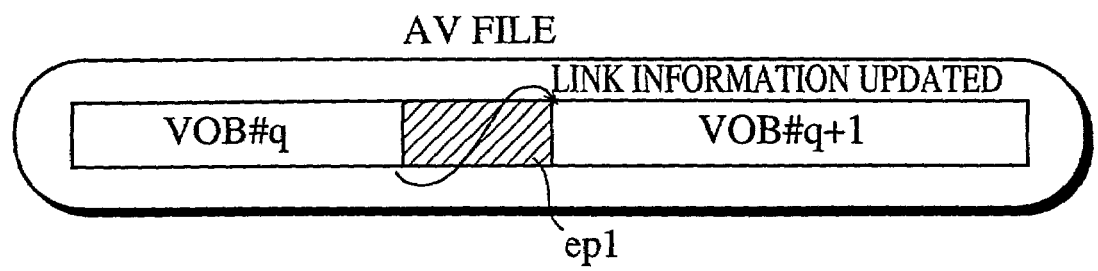

FIGS. 18A–18C show the transition of the contents of the AV file when VOBUs are deleted. Suppose VOB #q shown in FIG. 18A is contained in the AV file of FIG. 2, and the preceding and succeeding portions of a delete section in VOB #q have been updated to VOB #q and VOB #q+1 respectively as a result of steps S16 and S18, thereby creating free area ep1. After this, VOB #q and VOB #q+1 are linked according to link information of the AV file in step S19, as shown in FIG. 18C. This removes free area ep1 obtained by the partial deletion from the AV file, and allows new data to be recorded to this area. Hence the capacity of the DVD is increased.

Figure 19:
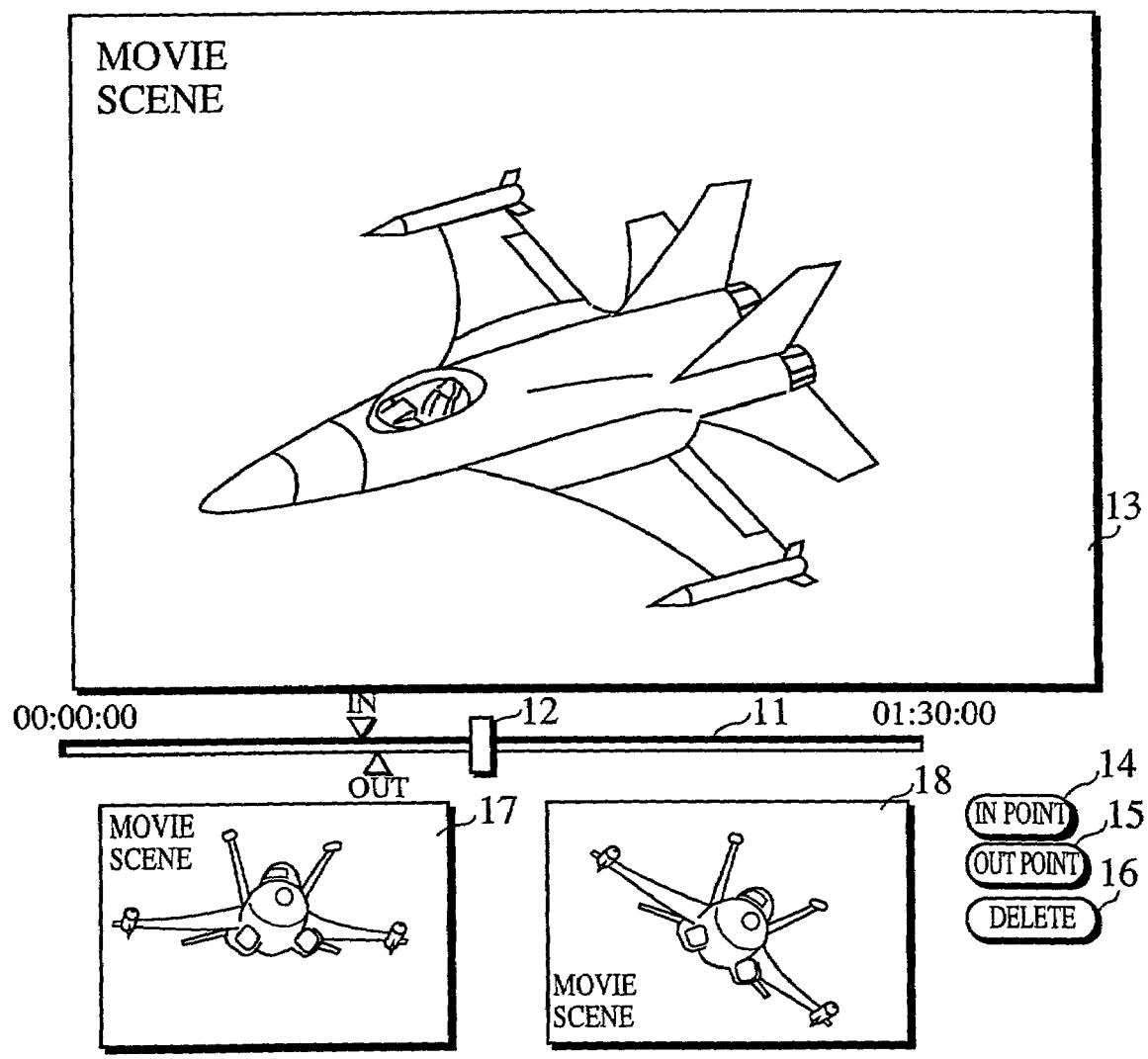
FIG. 19 shows an example of an interactive display when a delete section is set as a result of steps S4–S7 and steps S8–S11 in FIG. 13.
Figure 20:
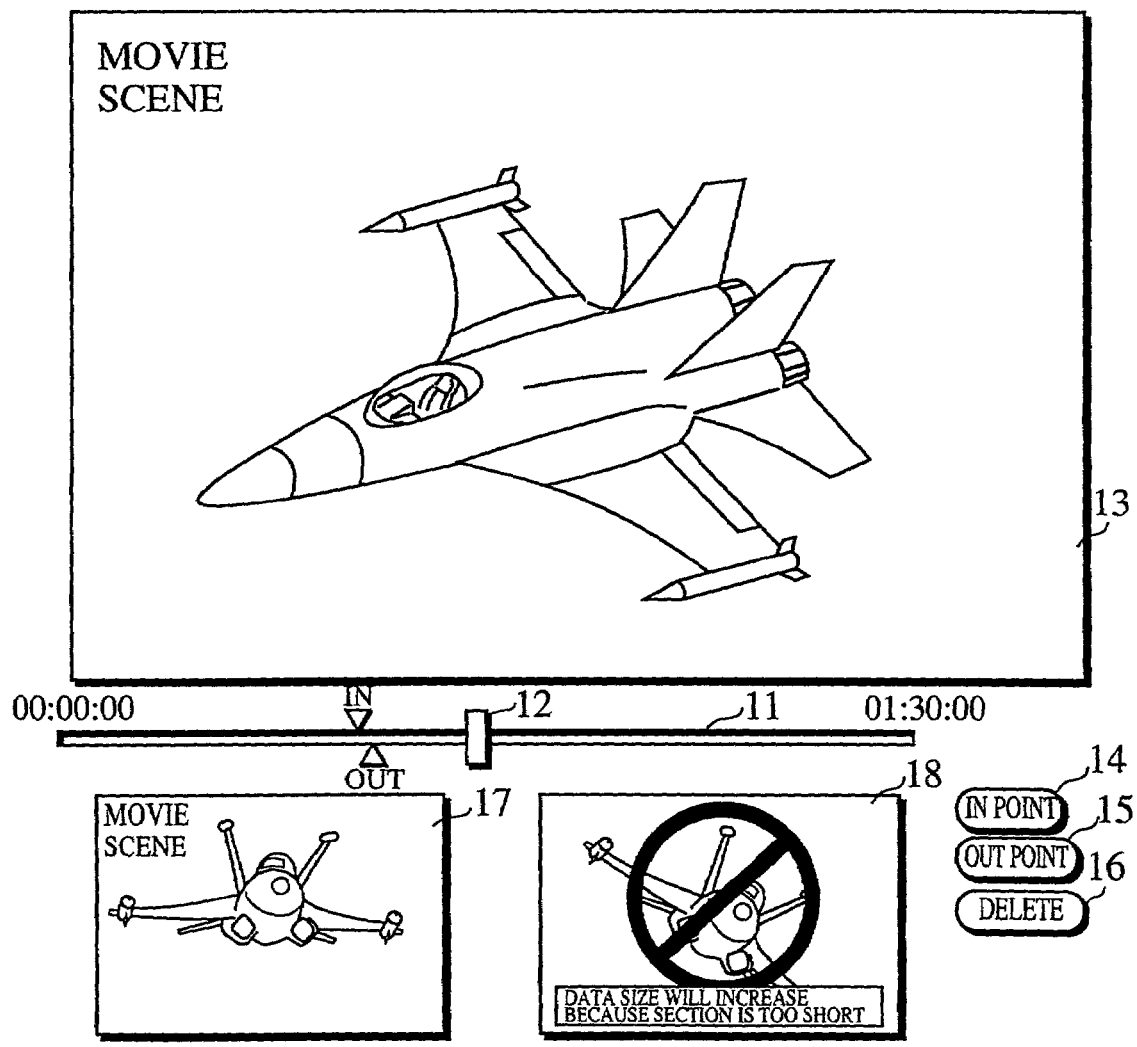
FIG. 20 shows an example of an interactive display for warning of a data size increase due to partial deletion.

FIG. 19 shows an example of an interactive display when the delete section is set as a result of steps S4–S7 and S8–S11. The ∇ mark and the Δ mark indicating the IN and OUT points are shown on the rail 11, and picture data corresponding to the IN point and picture data corresponding to the OUT point are displayed in thumbnail on the IN point thumbnail window 17 and the OUT point thumbnail window 18. When the user presses the delete button 16 on this display, VOBU #i and VOBU #j which respectively include the IN and OUT points are specified in step S12, and it is judged whether j−i−1≦t+s in step S13. Suppose, as shown by the thumbnail windows 17 and 18 of FIG. 19, the picture data corresponding to the IN point and the picture data corresponding to the OUT point are similar and the length of the delete section is no greater than 1.0 second. In such a case, the data increase warning and the prohibition mark are displayed in step S14. FIG. 20 shows an example of an interactive display for warning about data size increase caused by partial deletion. As illustrated, the warning that the data size will increase because the delete section is too short is displayed on the OUT point thumbnail window 18 together with the prohibition mark. After this, the procedure returns to the loop of steps S1–S3.

Upon viewing this warning, the user may select the slide bar 12 and move it to the right to extend the delete section.

Figure 21:
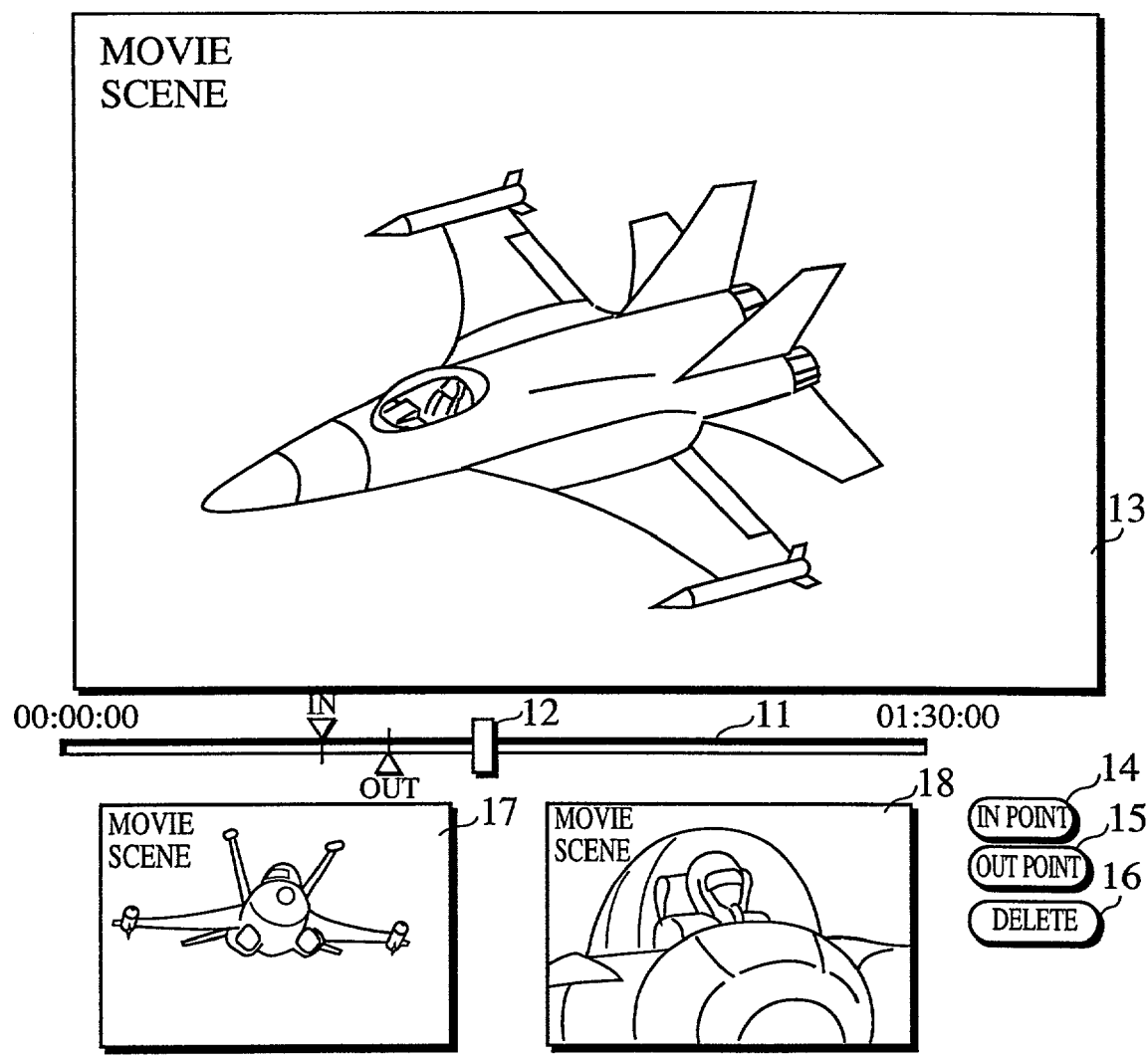
FIG. 21 shows an example of an interactive display after the user moves a slide bar.

FIG. 21 shows an example of an interactive display after the user has moved the slide bar 12. When compared with FIG. 19, the Δ mark indicating the OUT point has moved to the right, and a different thumbnail image is displayed on the OUT point thumbnail window 18. When the user presses the delete button 16 on this display, the judgement "Yes" is given in step S3 and the procedure advances to step S12.

Figure 22:
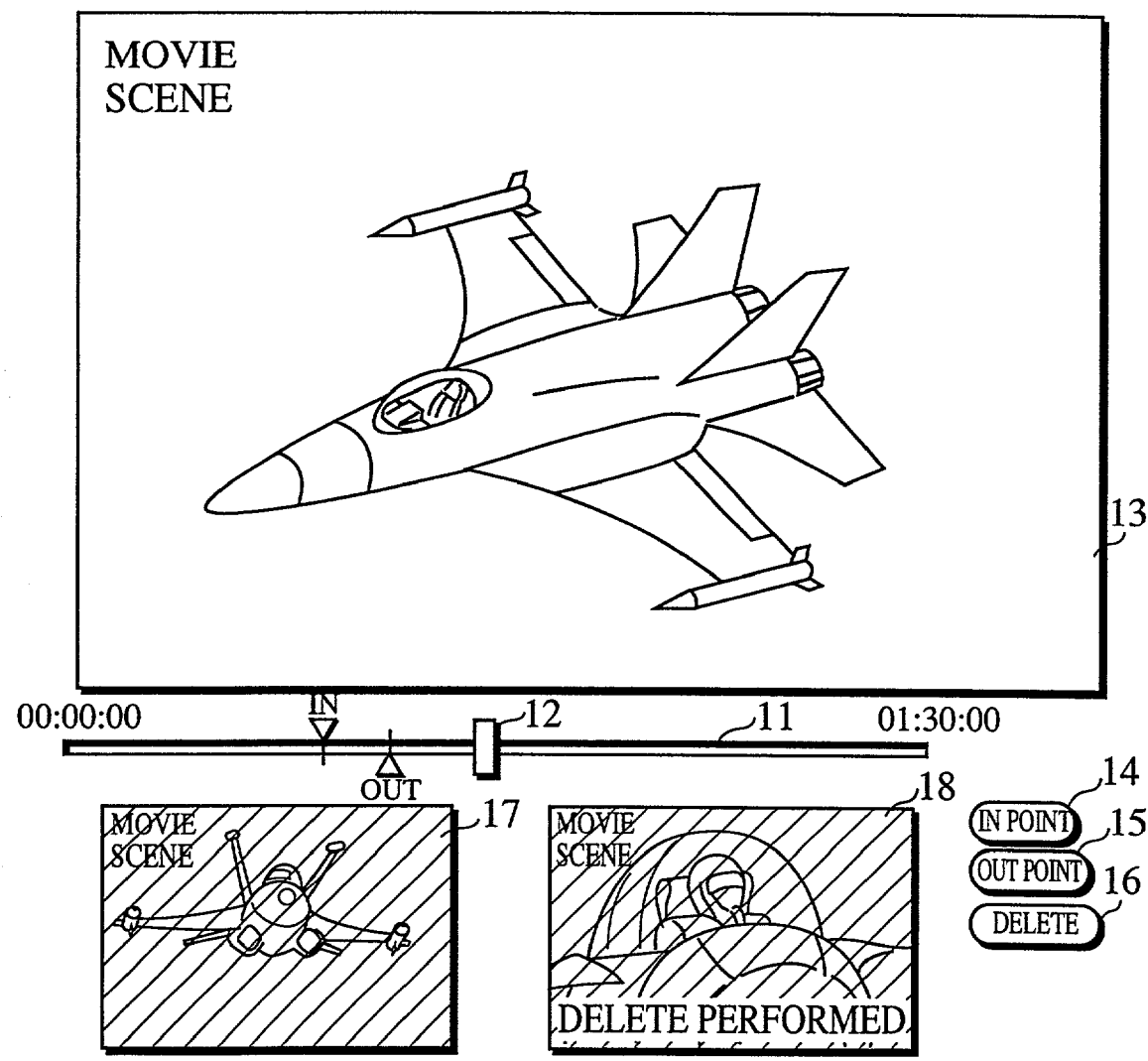
FIG. 22 shows an example of an interactive display after partial deletion.

In step S12 VOBU #i which includes the IN point and VOBU #j which includes the OUT point are specified, and in step S13 it is judged whether j−i−1≦t+s. Since the OUT point has been moved, the judgement "No" is given in step S13, and the procedure advances to steps S15–S19. FIG. 22 shows an example of an interactive display after the partial deletion. As illustrated, the IN point thumbnail window 17 and the OUT point thumbnail window 18 show that the partial deletion has been executed.

According to this embodiment, partial deletion is not performed if the number of VOBUs included in a delete section is no greater than s+t, and is performed only if the number of VOBUs is greater than s+t. Accordingly, there is no need to copy picture data included in the delete section, when performing the partial deletion. Since the partial deletion is prohibited when the delete section is too short, the user will not suspect the editing apparatus to be faulty in partial deletion. This strengthens the reliability of the editing apparatus.

Second Embodiment

The first embodiment describes the case where partial deletion is prohibited if a delete section is no greater than three VOBUs. In the second embodiment, partial deletion of no greater than three VOBUs is prohibited when the editing apparatus is set to prioritize acquirement of free space, whereas the partial deletion is permitted when the editing apparatus is set to prioritize flexibility in editing. Accordingly, the editing apparatus of the second embodiment has two modes, namely, a mode for prioritizing acquirement of free space (capacity priority mode) and a mode for prioritizing flexibility in editing (editing priority mode). FIG. 23 shows an example of a menu display for selecting one of the two modes. If the capacity priority mode is selected on this display, the editing apparatus performs the same processing as in the first embodiment. In other words, the editing apparatus judges whether the delete section is no greater than three VOBUs, and if so, does not perform the partial deletion. If the editing priority mode is selected, on the other hand, the editing apparatus performs the partial deletion even if the delete section is no greater than three VOBUs.

Figure 24:
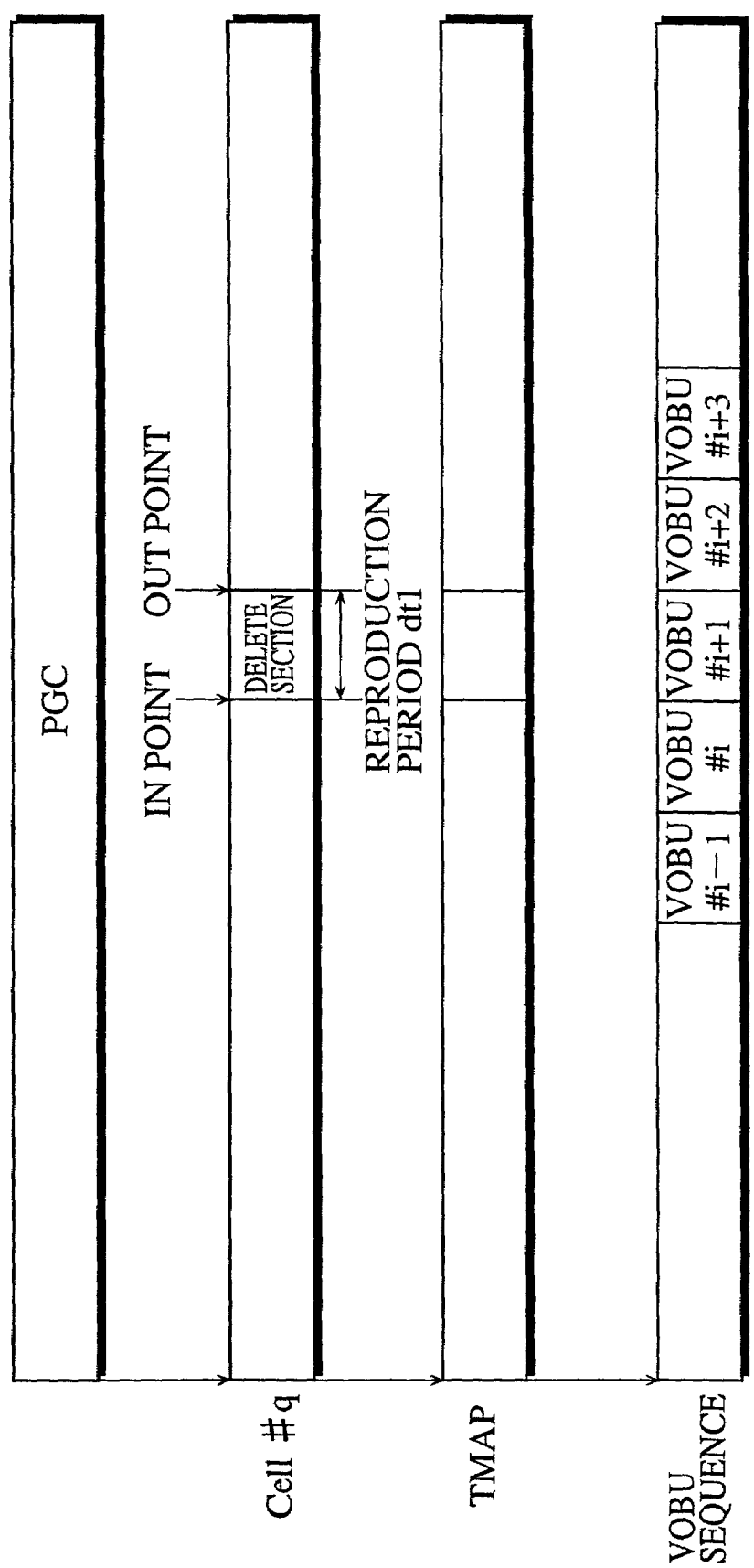
FIG. 24 shows a process of partial deletion in the second embodiment.
Figure 25:
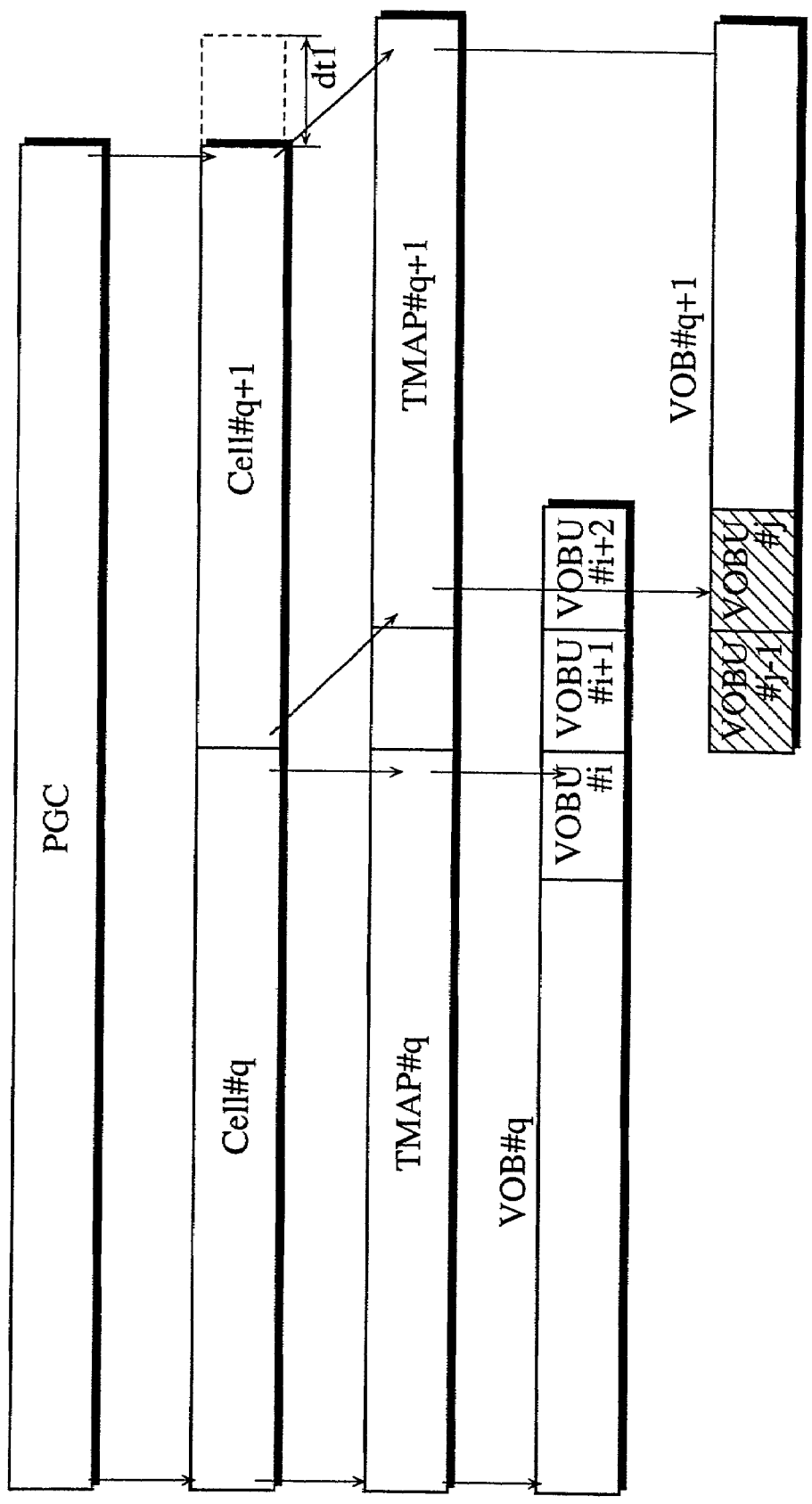
FIG. 25 shows the process of partial deletion in the second embodiment.

FIGS. 24 and 25 show a process of partial deletion in the second embodiment. When a delete section is midway through Cell #q as shown in FIG. 24, the start of Cell #q to the IN point are set as Cell #q and the OUT point to the end of original Cell #q are set as Cell #q+1, as in the first embodiment. Next, VOBU #i including picture data corresponding to the IN point is specified, and the start of VOB #q to VOBU #i+2 are set as VOB #q. Further, VOBU #j including picture data corresponding to the OUT point, and VOBU #j−1 immediately preceding VOBU #j, are specified. Since the delete section is one VOBU long, VOBU #j−1 immediately preceding VOBU #j is the same as VOBU #i+1, and VOBU #j is the same as VOBU #i+2. These VOBUs have already been set as part of new VOB #q, so that if left unchanged VOBU #j and VOBU #j−1 will end up being nonexistent. Accordingly, VOBU #i+1 and VOBU #i+2 are copied and the copies are set as VOBU #j−1 and VOBU #j, as shown in FIG. 25 (the hatched areas indicate that these VOBUs are obtained by copying). Lastly, VOBU #j−1 to the end of original VOB #q are set as VOB #q+1.

Figure 26:
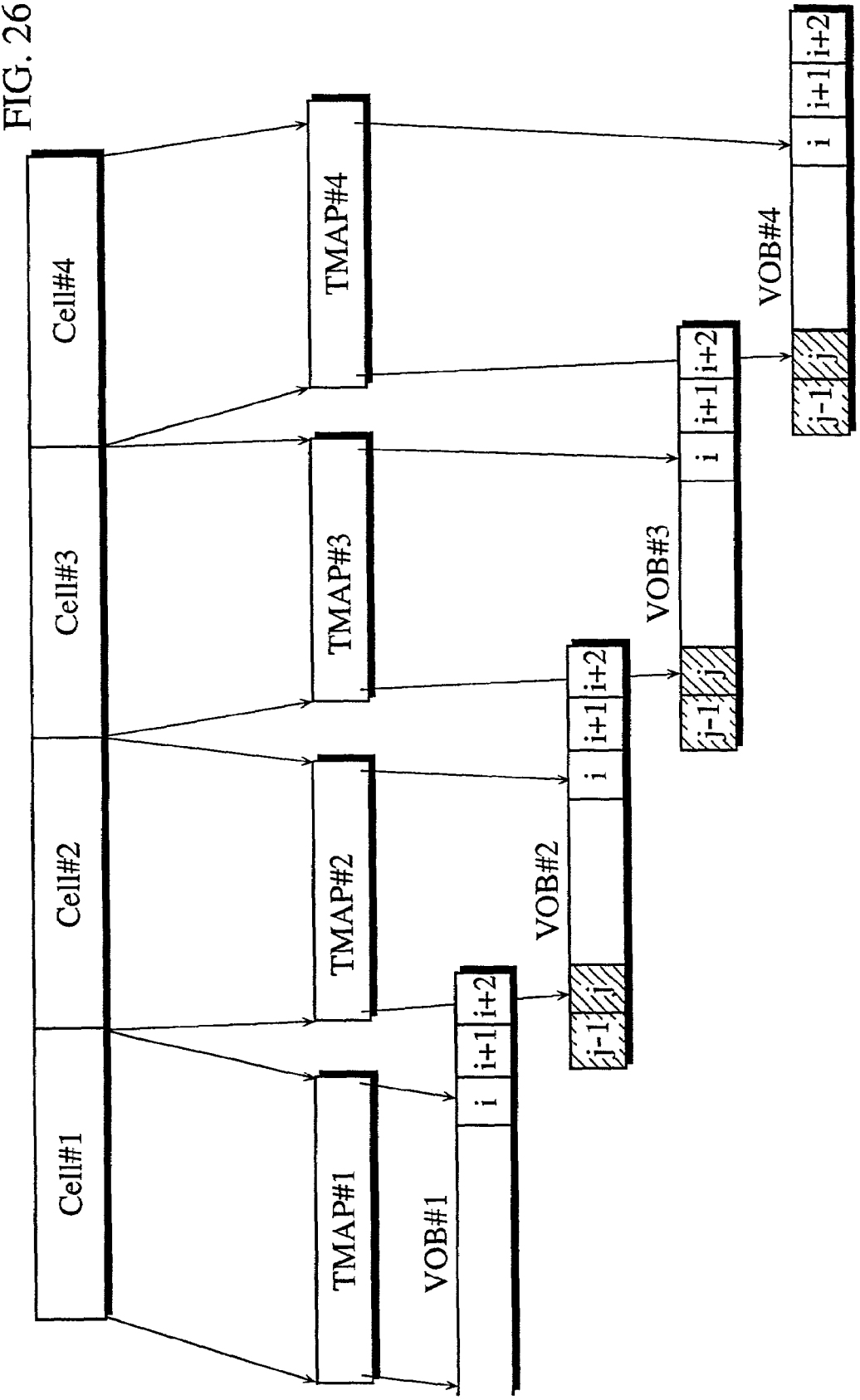
FIG. 26 shows reproduction points which appear on the DVD as a result that partial deletion is repeated in the second embodiment.

FIG. 26 shows reproduction points which appear on the DVD as a result that the above partial deletion is repeated. As shown in the drawing, such partial deletes cause the overlapping parts indicated by the hatched areas and result in increases in data size of the DVD, but nevertheless they have been executed.

Figure 27:
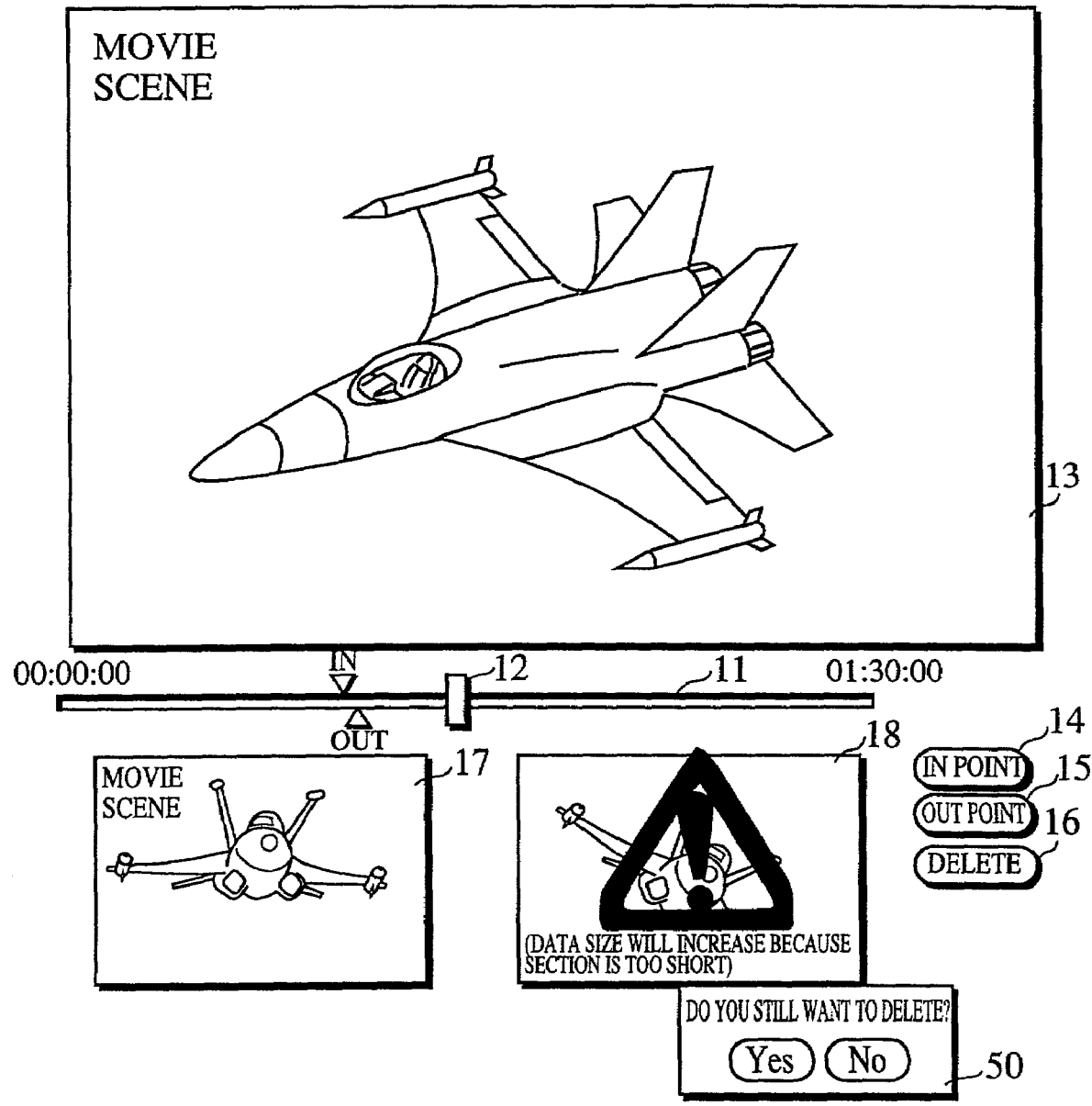
FIG. 27 shows an example of an interactive display for warning of a data size increase in the second embodiment.

To inform the user of the effect of such partial deletion, each time the partial deletion is performed the editing apparatus of the second embodiment displays a warning of a data size increase together with a warning mark "!" as shown in FIG. 27, in order to notify the user that the data size will increase if the partial deletion such as that shown in FIG. 26 is performed. The editing apparatus also displays a menu 50 for accepting an indication as to whether the user still wants to perform the partial deletion, and if the "Yes" button is selected on the menu 50, performs the partial deletion. Otherwise, the editing apparatus does not perform the partial deletion.

With this embodiment, if the user wants to delete a short section of about one second, he or she can do so by setting the editing priority mode. Since partial deletion that will increase the data size of the DVD is performed only when the editing apparatus is set in the editing priority mode, the user would not be troubled by increases in data size.

The present invention has been described by way of the above embodiments, though these embodiments are mere examples of systems that are presently expected to operate favorably. It should be obvious that various modifications can be made without departing from the technical scope of this invention. Four representative examples of such modifications are given below.

(A) In the above embodiments, the DVD player was described as being a device to be used in place of a domestic non-portable videocassette recorder. However, when a DVD-RAM is used as a recording medium for a computer, the following construction is also possible. The disk drive may be connected to a computer bus via a SCSI (Small Computer Systems Interface), an IDE (Integrated Drive Electronics), or IEEE (Institute of Electrical and Electronics Engineers) 1394 interface so as to operate as a DVD-RAM drive. Also, the components aside from the disk drive may be realized by computer hardware, computer OS (operating system), and application software that is run on the OS.

(B) In the above embodiments, only video streams and audio streams were described as being multiplexed into VOBs. However, sub-picture data including of text for subtitles that has been subjected to run-length compression may also be multiplexed into VOBs.

(C) The procedure shown in the flowchart in FIG. 13 can be achieved by a machine language program. Such a machine language program may be distributed and sold having been recorded on a storage medium. Examples of such a storage medium are an IC (integrated circuit) card, an optical disk, or a floppy disk. The machine language program recorded on the storage medium may then be installed into a standard computer. By executing the installed machine language program, the standard computer can achieve the functions of the DVD player of the above embodiments.

(D) The above embodiments describe the case where partial deletion is performed in units of VOBUs, but partial deletion may be performed in another unit that forms a VOB. Also, a VOB obtained by multiplexing video and audio streams is subjected to partial deletion in the above embodiments, but the VOB may include only a video stream.

Furthermore, a video stream to be multiplexed in a VOB is compression-coded under MPEG standard in the above embodiments, but the video stream may be compression-coded by other coding modes that use correlation with other picture data.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. An editing apparatus for an optical disk on which a video object made up of a plurality of blocks and section information are recorded, each block including a plurality of sets of picture data, and the section information specifying a reproduction section from a set of picture data included in a block to a set of picture data included in another block, the editing apparatus comprising:
   a specifying unit operable to specify a set of picture data as a start point of a delete section and another set of picture data as an end point of the delete section in the reproduction section, in accordance with an indication from a user;
   a judging unit operable to judge whether $j-i-1>u$ or $j-i-1<u$, $j-i-1$ being a total number of blocks present between an ith block which includes the start point and a jth block which includes the end point, i and j being integers, and u being a predetermined integer;
   a warning unit operable to give a warning to the user, when $j-i-1<u$; and
   a partial deleting unit operable to rewrite, when $j-i-1>u$, the section information so that part of the reproduction section preceding the delete section and part of the reproduction section succeeding the delete section become two consecutive reproduction sections, and delete blocks from an (i+s+1)th block to a (j−t−1)th block from the optical disk, s and t being integers that satisfy $u=s+t$.

2. The editing apparatus of claim 1,
   wherein at least one set of picture data included in the ith block has been compression-coded based on correlation with at least one set of picture data included in an (i+s)th block, and
   at least one set of picture data included in the jth block has been compression-coded based on correlation with at least one set of picture data included in a (j−t)th block.

3. The editing apparatus of claim 1,
   wherein each block includes audio data in addition to the plurality of sets of picture data,
   an (i+s)th block includes audio data which is to be reproduced synchronously with at least one set of picture data included in the ith block, and
   at least one set of picture data included in the jth block has been compression-coded based on correlation with at least one set of picture data included in a (j−t)th block.

4. The editing apparatus of claim 1 further comprising
   a dividing unit operable to copy, when $j-i-1<u$, part of blocks from the ith block to an (i+s)th block which overlaps blocks from a (j−t)th block to the jth block, set a block sequence from the start of the video object to the (i+s)th block and a block sequence from the copied part to the end of the video object as two independent video objects, and rewrite the section information so that the two video objects become the two consecutive reproduction sections,
   wherein the warning unit warns the user that a size of data recorded on the optical disk will increase due to the copying.

5. The editing apparatus of claim 4 further comprising:
   a holding unit operable to hold mode information showing that the editing apparatus is in a capacity priority mode, the capacity priority mode being a mode that prioritizes acquirement of free space on the optical disk; and
   a switching unit operable to switch the mode information to an editing priority mode in accordance with an indication from the user, the editing priority mode being a mode that prioritizes flexibility in editing,
   wherein the dividing unit copies the part only when the mode information shows the editing priority mode.

6. The editing apparatus of claim 5,
   wherein if $j-i-1<u$ when the mode information shows the capacity priority mode, the specifying unit once again specifies the two sets of picture data as the start and end points so as to extend the delete section, in accordance with an indication from the user.

7. An editing apparatus for an optical disk on which a video object made up of a plurality of blocks and section information are recorded, each block including a plurality of sets of picture data, and the section information specifying a reproduction section from a set of picture data included in a block to a set of picture data included in another block, the editing apparatus comprising:
   a specifying unit operable to specify a set of picture data as a start point of a delete section and another set of picture data as an end point of the delete section in the reproduction section, in accordance with an indication from a user;
   a judging unit operable to judge whether $j-i-1>u$ or $j-i-1<u$, $j-i-1$ being a total number of blocks present between an ith block which includes the start point and a jth block which includes the end point, i and j being integers, and u being a predetermined integer;
   a notifying unit operable to notify the user that the deletion is prohibited, when $j-i-1<u$; and
   a partial deleting unit operable to rewrite, when $j-i-1>u$, the section information so that part of the reproduction section preceding the delete section and part of the reproduction section succeeding the delete section become two consecutive reproduction sections, and delete blocks from an (i+s+1)th block to a (j−t−1)th block from the optical disk, s and t being integers that satisfy $u=s+t$.

8. The editing apparatus of claim 7,
   wherein at least one set of picture data included in the ith block has been compression-coded based on correlation with at least one set of picture data included in an (i+s)th block, and
   at least one set of picture data included in the jth block has been compression-coded based on correlation with at least one set of picture data included in a (j−t)th block.

9. The editing apparatus of claim 7,
   wherein each block includes audio data in addition to the plurality of sets of picture data,
   an (i+s)th block includes audio data which is to be reproduced synchronously with at least one set of picture data included in the ith block, and
   at least one set of picture data included in the jth block has been compression-coded based on correlation with at least one set of picture data included in a (j−t)th block.

10. The editing apparatus of claim 7,
    wherein if $j-i-1<u$, the specifying unit once again specifies the two sets of picture data as the start and end points so as to extend the delete section, in accordance with an indication from the user.

11. A computer-readable storage medium storing an editing program that performs editing on a computer for an optical disk on which a video object made up of a plurality of blocks and section information are recorded, each block including a plurality of sets of picture data, and the section information specifying a reproduction section from a set of picture data included in a block to a set of picture data included in another block, the editing program comprising:
   a specifying step for specifying a set of picture data as a start point of a delete section and another set of picture data as an end point of the delete section in the reproduction section, in accordance with an indication from a user;
   a judging step for judging whether j−i−1>u or j−i−1<u, j−i−1 being a total number of blocks present between an ith block which includes the start point and a jth block which includes the end point, i and j being integers, and u being a predetermined integer;
   a warning step for giving a warning to the user, when j−i−1<u; and
   a partial deleting step for rewriting, when j−i−1>u, the section information so that part of the reproduction section preceding the delete section and part of the reproduction section succeeding the delete section become two consecutive reproduction sections, and deleting blocks from an (i+s+1)th block to a (j−t−1)th block from the optical disk, s and t being integers that satisfy u=s+t.

12. The storage medium of claim 11, wherein the editing program further comprises
   a dividing step for copying, when j−i−1<u, part of blocks from the ith block to an (i+s)th block which overlaps blocks from a (j−t)th block to the jth block, setting a block sequence from the start of the video object to the (i+s)th block and a block sequence from the copied part to the end of the video object as two independent video objects, and rewriting the section information so that the two video objects become the two consecutive reproduction sections,
   wherein the warning step warns the user that a size of data recorded on the optical disk will increase due to the copying.

13. The storage medium of claim 12,
   wherein the computer includes a holding unit which holds mode information showing that the editing apparatus is in a capacity priority mode, the capacity priority mode being a mode that prioritizes acquirement of free space on the optical disk,
   the editing program further comprises
   a switching step for switching the mode information to an editing priority mode in accordance with an indication from the user, the editing priority mode being a mode that prioritizes flexibility in editing, and
   the dividing step copies the part only when the mode information shows the editing priority mode.

14. The storage medium of claim 13,
   wherein if j−i−1<u when the mode information shows the capacity priority mode, the specifying step once again specifies the two sets of picture data as the start and end points so as to extend the delete section, in accordance with an indication from the user.

15. A computer-readable storage medium storing an editing program that performs editing on a computer for an optical disk on which a video object made up of a plurality of blocks and section information are recorded, each block including a plurality of sets of picture data, and the section information specifying a reproduction section from a set of picture data included in a block to a set of picture data included in another block, the editing program comprising:
   a specifying step for specifying a set of picture data as a start point of a delete section and another set of picture data as an end point of the delete section in the reproduction section, in accordance with an indication from a user;
   a judging step for judging whether j−i−1>u or j−i−1<u, j−i−1 being a total number of blocks present between an ith block which includes the start point and a jth block which includes the end point, i and j being integers, and u being a predetermined integer;
   a notifying step for notifying the user that the deletion is prohibited, when j−i−1<u; and
   a partial deleting step for rewriting, when j−i−1>u, the section information so that part of the reproduction section preceding the delete section and part of the reproduction section succeeding the delete section become two consecutive reproduction sections, and deleting blocks from an (i+s+1)th block to a (j−t−1)th block from the optical disk, s and t being integers that satisfy u=s+t.

16. The storage medium of claim 15,
   wherein if j−i−1<u, the specifying step once again specifies the two sets of picture data as the start and end points so as to extend the delete section, in accordance with an indication from the user.

17. An editing program for performing editing on a computer for an optical disk on which a video object made up of a plurality of blocks and section information are recorded, each block including a plurality of sets of picture data, and the section information specifying a reproduction section from a set of picture data included in a block to a set of picture data included in another block, the editing program comprising:
   a specifying step for specifying a set of picture data as a start point of a delete section and another set of picture data as an end point of the delete section in the reproduction section, in accordance with an indication from a user;
   a judging step for judging whether j−i−1>u or j−i−1<u, j−i−1 being a total number of blocks present between an ith block which includes the start point and a jth block which includes the end point, i and j being integers, and u being a predetermined integer;
   a warning step for giving a warning to the user, when j−i−1<u; and
   a partial deleting step for rewriting, when j−i−1>u, the section information so that part of the reproduction section preceding the delete section and part of the reproduction section succeeding the delete section become two consecutive reproduction sections, and deleting blocks from an (i+s+1)th block to a (j−t−1)th block from the optical disk, s and t being integers that satisfy u=s+t.

18. The editing program of claim 17,
   wherein the editing program further comprises
   a dividing step for copying, when j−i−1<u, part of blocks from the ith block to an (i+s)th block which overlaps blocks from a (j−t)th block to the jth block, setting a block sequence from the start of the video object to the (i+s)th block and a block sequence from the copied part to the end of the video object as two independent video objects, and rewriting the section information so that the two video objects become the two consecutive reproduction sections, wherein the warning step warns the user that a size of data recorded on the optical disk will increase due to the copying.

19. The editing program of claim 18, wherein the computer includes a holding unit which holds mode information showing that the editing apparatus is in a capacity priority mode, the capacity priority mode being a mode that prioritizes acquirement of free space on the optical disk, the editing program further comprises a switching step for switching the mode information to an editing priority mode in accordance with an indication from the user, the editing priority mode being a mode that prioritizes flexibility in editing, and the dividing step copies the part only when the mode information shows the editing priority mode.

20. The editing program of claim 19, wherein if j−i−1<u when the mode information shows the capacity priority mode, the specifying step once again specifies the two sets of picture data as the start and end points of the delete section, in accordance with an indication from the user.

21. An editing program for performing editing on a computer for an optical disk on which a video object made up of a plurality of blocks and section information are recorded, each block including a plurality of sets of picture data, and the section information specifying a reproduction section from a set of picture data included in a block to a set of picture data included in another block, the editing program comprising:

a specifying step for specifying a set of picture data as a start point of a delete section and another set of picture data as an end point of the delete section in the reproduction section, in accordance with an indication from a user;

a judging step for judging whether j−i−1>u or j−i−1<u, j−i−1 being a total number of blocks present between an ith block which includes the start point and a jth block which includes the end point, i and j being integers, and u being a predetermined integer;

a notifying step for notifying the user that the deletion is prohibited, when j−i−1<u; and a partial deleting step for rewriting, when j−i−1>u, the section information so that part of the reproduction section preceding the delete section and part of the reproduction section succeeding the delete section become two consecutive reproduction sections, and deleting blocks from an (i+s+1)th block to a (j−t−1)th block from the optical disk, s and t being integers that satisfy u=s+t.

22. The editing program of claim 21, wherein if j−i−1<u, the specifying step once again specifies the two sets of picture data as the start and end points so as to extend the delete section, in accordance with an indication from the user.

* * * * *